(12) United States Patent
Popp et al.

(10) Patent No.: US 7,787,723 B2
(45) Date of Patent: Aug. 31, 2010

(54) SUPPORT ELEMENT FOR MOUNTING OPTICAL ELEMENTS AND METHOD OF PRODUCING SUCH A SUPPORT ELEMENT

(75) Inventors: Martin Popp, Mainz (DE); Ingo Smaglinski, Mainz (DE); Jens Haase, Mainz (DE); Gerhard Himmelsbach, Groβ-Gerau (DE)

(73) Assignee: Cube Optics AG (DE)

( * ) Notice: Subject to any disclaimer, the term of this patent is extended or adjusted under 35 U.S.C. 154(b) by 1440 days.

(21) Appl. No.: 10/534,341

(22) PCT Filed: Nov. 11, 2002

(86) PCT No.: PCT/DE02/04175
§ 371 (c)(1),
(2), (4) Date: May 9, 2005

(87) PCT Pub. No.: WO2004/044633
PCT Pub. Date: May 27, 2004

(65) Prior Publication Data
US 2006/0060734 A1 Mar. 23, 2006

(51) Int. Cl.
*G02B 6/26* (2006.01)
(52) U.S. Cl. .......................... 385/31; 362/268
(58) Field of Classification Search ............ None
See application file for complete search history.

(56) References Cited

U.S. PATENT DOCUMENTS

| | | | | |
|---|---|---|---|---|
| 593,024 | A * | 11/1897 | Kinsey | 206/5 |
| 1,258,621 | A * | 3/1918 | Jenkins | 206/5 |
| 2,821,108 | A * | 1/1958 | Warmisham et al. | 359/724 |
| 3,981,564 | A * | 9/1976 | Hoos | 359/826 |
| 4,187,534 | A * | 2/1980 | Tichenor et al. | 362/268 |
| 4,676,599 | A * | 6/1987 | Cruz | 359/829 |
| 4,796,756 | A * | 1/1989 | Ott | 206/454 |
| 5,009,473 | A * | 4/1991 | Hunter et al. | 359/214.1 |
| 5,859,717 | A * | 1/1999 | Scobey et al. | 398/79 |
| 6,094,288 | A * | 7/2000 | Tamburrini | 359/224.1 |
| 6,118,912 | A * | 9/2000 | Xu | 385/24 |
| 6,172,822 | B1 * | 1/2001 | Belliveau et al. | 359/819 |
| 6,327,103 | B1 * | 12/2001 | Belliveau et al. | 359/819 |
| 6,341,703 | B1 * | 1/2002 | Wu | 211/41.18 |
| 6,407,838 | B1 * | 6/2002 | Canoglu et al. | 398/101 |
| 6,418,250 | B1 * | 7/2002 | Corbosiero et al. | 385/24 |
| 6,636,654 | B2 * | 10/2003 | McGuire, Jr. | 385/17 |
| 6,782,205 | B2 * | 8/2004 | Trisnadi et al. | 398/94 |
| 6,836,590 | B2 * | 12/2004 | Richard et al. | 385/36 |
| 6,941,073 | B2 * | 9/2005 | McGuire | 398/84 |
| 7,203,421 | B2 * | 4/2007 | McGuire, Jr. | 398/49 |
| 7,246,949 | B2 * | 7/2007 | Thiele et al. | 385/54 |

FOREIGN PATENT DOCUMENTS

JP 2002-23002 A 1/2002

* cited by examiner

*Primary Examiner*—Charlie Peng
*Assistant Examiner*—Peter Radkowski
(74) *Attorney, Agent, or Firm*—Paul & Paul

(57) ABSTRACT

The invention relates to a support element (1), for mounting at least two wave-modifying elements, with support of services, arranged parallel to each other. According to the invention, support element for mounting at least two wave-modifying elements and corresponding production method maybe achieved, whereby the support surfaces each have at least one opening and the openings are connected to each other by means of at least one through drilling.

39 Claims, 33 Drawing Sheets

SUPPORT ELEMENT FOR MOUNTING OPTICAL ELEMENTS AND METHOD OF PRODUCING SUCH A SUPPORT ELEMENT

BACKGROUND OF THE INVENTION

The present invention concerns a support element for mounting at least two wave-modifying elements and a corresponding production method.

The present invention further concerns an optical modifier, for example for coupling in and out signals of individual or a plurality of wavelength channels into or out of waveguides with such a support element.

The term wave-modifying element is used to denote any element which, placed in the beam path, influences one, a plurality of or even all wavelength channels of the optical channel. The term influence is used to denote for example reflecting, absorbing, amplifying, attenuating, interrupting or polarising.

It is usual in the meantime in particular in the telecommunication and data communication art for items of information to be transmitted optically, that is to say for example by way of optical waveguides. Optical waveguides are generally thin fibres comprising highly transparent optical materials which conduct light in the longitudinal direction thereof by multiple total reflection. The light which generally enters by way of a smooth entrance surface follows all the bends of the fibres and issues again at the end from an end surface which is generally also smooth. The electrical signals which are to be transmitted are converted after suitable modulation by an electrooptical transducer into light signals, generally in the infrared range, coupled into the optical waveguide, transmitted by the optical waveguide and converted back into electrical signals at the end by an optoelectrical transducer. In order to increase the transmission rate of the optical waveguides, it is in the meantime usual for a plurality of different communication signals to be transmitted simultaneously by way of an optical waveguide. For that purpose the communication signals are modulated. Respectively different carrier frequencies are used for the different communication signals, which frequencies are also referred to as channels. After transmission of the individual communication signals or wavelength channels by way of the optical waveguide the individual signals have to be separated and demodulated.

Therefore, devices for adding and selecting wavelength-encoded signals (light of a specific wavelength or specific wavelengths), so-called multiplexer or demultiplexer arrangements, are known in the art. Such devices use optical fibres which have a high level of information carrier density. The purpose of the devices is inter alia to separate from the plurality of transmitted items of information a corresponding item of information or a corresponding wavelength channel. For example narrow band mirrors are used for that separation procedure, which allow specific frequencies of the light to pass virtually unhindered while selected frequencies are reflected. When the light issues from the glass fibre however this inevitably involves beam spreading which has the result that either the intensity at the imaging point, that is to say at the point at which the filtered light is evaluated, is markedly reduced, or the use of suitable lens systems, for example gradient index lenses (GRIN lenses) is necessary in order to collimate the light on to the appropriate imaging point. As the embodiment with the lenses however suffers from the disadvantage that on the one hand they are fairly expensive and on the other hand require very accurate adjustment and in addition the imaging properties are also still wavelength-dependent, WO 02/21733 already proposed a coupling device having a curved reflecting surface. That coupling device serves for coupling signals for example into or out of glass fibres. The use of a reflecting surface makes it possible to forego the optical lens system as the beam spreading effect which inevitably occurs at the end of a glass fibre is at least partly compensated by the curved surface.

In the structure described in WO 02/21733 the wave-modifying elements are laid on both sides of a glass plate and possibly fixed thereon. That provides that the wave-modifying elements are arranged substantially on two mutually parallel planes so that a multiplexer-demultiplexer can be implemented by suitable positioning of the wave-modifying elements.

The use of the glass plate has the disadvantage however that the signal suffers from attenuation in the glass, that reflection phenomena can occur at the interfaces of the glass plate and that it is not possible to insert a further wave-modifying element between two wave-modifying elements which are mounted on opposite sides of the glass plate.

The structure with the glass plate further suffers from the disadvantage that the parallel surfaces of the glass plate are frequently not entirely in plane-parallel relationship with each other, which makes it necessary to effect expensive re-adjustment of the individual filters on the glass plate.

SUMMARY OF THE INVENTION

Therefore, taking that state of the art as its basic starting point, the object of the invention is to provide a support element for mounting at least two optical elements having two supporting surfaces which are arranged in mutually parallel relationship, which is simple and inexpensive to produce and which avoids the disadvantages of the state of the art. A further object of the invention is to provide a method of producing such a support element.

According to the invention that object is attained in that the supporting surfaces each have at least one opening, wherein the openings are connected together by way of at least one through bore. The consequence of this is that the wave-modifying elements can be positioned on the support element in such a way that the beam path extends through the at least one through bore and not through the support element. That in turn has the consequence that there is no loss of intensity between the individual wave-modifying elements and in addition no disrupting reflections occur at the interface in relation for example to a glass plate. In addition, with the device according to the invention, it is not necessary for the support element to be produced from a material which is transparent for the corresponding frequencies of the individual wavelength channels. It will be appreciated that the openings do not have to be connected together directly by the at least one through bore, but for example can each have a respective through bore for a channel or a recess so that the beam path extends from a through bore of the one supporting surface through the channel or the recess into another through bore of the other supporting surface.

It will be appreciated that a through bore does not necessarily have to be produced with a boring tool or drill. Rather, any aperture or recess which is suitable for connecting the openings of the supporting surfaces together is possible.

A particularly preferred embodiment provides that the supporting portion is in one piece. That has the advantage that there is no need for adjustment of the individual supporting surfaces relative to each other. The wave-modifying elements can be simply laid on to the corresponding supporting surfaces of the support portion and possibly fixed.

Advantageously, at least one and preferably each wave-modifying element is disposed on the supporting surface in such a way that a corresponding opening is at least partially and preferably completely covered by a respective one or a plurality of wave-modifying elements. Completely covering the opening permits simpler fixing of the wave-modifying elements on the supporting surface as the wave-modifying elements can be arranged on the supporting surface in a position of completely covering an opening and can be fixed in that position with a bonding agent, for example adhesive, without an amount of adhesive worth mentioning flowing into the through bore and possibly passing into the beam path.

It is further provided on the preferred embodiment that at least one supporting surface has an opening for coupling a light signal in and/or out. In other words, an opening is not provided with a wave-modifying element so that the light can penetrate unchanged into a corresponding through bore in the support portion.

A particularly preferred embodiment provides that at least one supporting surface has at least two openings and an opening of the other supporting surface is on the median perpendicular on the connecting line between the two openings of the first supporting surface. In other words the openings of the individual supporting surfaces are arranged in mutually displaced relationship so that this affords a zigzag shaped beam path. With a suitable arrangement of the openings (and the through bores connecting same), re-adjustment of the wave-modifying elements which are disposed on the supporting surfaces is not necessary.

It will be appreciated that the openings and the through bores can in principle be of any configuration. Circular bores, slots or recesses are advantageously used.

A further particularly preferred embodiment provides that the support portion is produced from a plastically and/or elastically deformable material. This has the advantage that the adjustment accuracy when applying a wave-modifying element to the supporting surface is enhanced. As already mentioned, it is provided in accordance with the invention that no adjustment is made but the wave-modifying elements are adjusted passively solely by mounting the wave-modifying elements on the supporting surface. It can now happen however that the surface of the wave-modifying elements is uneven and in particular it can happen that there are individual, relatively small, substantially punctiform raised portions on the surface of the wave-modifying elements. Such a raised portion however has the result that the corresponding wave-modifying element, when it is applied to the supporting surface, is not oriented completely parallel to the other wave-modifying elements. By virtue of the fact that the support portion comprises a ductile and/or elastically deformable material, a suitable pressure can be applied to the wave-modifying element in the direction of the supporting surface upon passive adjustment of the wave-modifying element on the supporting surface, so that any punctiform raised portion which may be present is pressed into the ductile material. That therefore entails locally limited plastic or elastic deformation of the supporting surface, whereby adjustment of the wave-modifying element on the supporting surface is improved. It will be appreciated that the passive adjustment method according to the invention as described herein, in which a wave-modifying element is pressed against a plastically and/or elastically deformable supporting surface, is not limited to the adjustment of wave-modifying elements on support portions, but can be advantageously used quite generally in the adjustment of any optical elements such as for example lenses, filters and so forth on any supporting or carrier elements. It is only essential that the material constituting the supporting element or the support element is elastically and/or plastically, preferably plastically, deformable, and in the adjustment procedure the optical element is pressed on to the supporting surface on the supporting or support element. It will be appreciated that for that purpose the entire support or carrier element does not necessarily have to consist of elastically and/or plastically deformable material, but it is completely sufficient if the corresponding supporting surface has at least a layer of an elastically and/or plastically deformable material.

It has been found that the support portion advantageously comprises a material which involves a lower level of hardness than the material constituting the wave-modifying elements (in general quartz glass or a glass ceramic). It was demonstrated in numerous tests that, in a particularly preferred embodiment, the material of the support element at least in the region of the supporting surfaces has a Knoop hardness (in accordance with ISO 9385) of less than 400 HK, particularly preferably less than 300 HK.

Alternatively or in combination therewith the material of the support element is so selected that the maximum compression strength is less than 1500 MPa, preferably less than 800 MPa, particularly preferably less than 450 MPa.

The support portion is advantageously made from brass, steel, iron, copper, nickel silver, silver, gold or plastic material, preferably POM or PEEK. It has been found that those materials are particularly advantageous for the production of the support portion according to the invention, in regard to machining thereof and at least in part also in regard to their ductile behavior.

In a further preferred embodiment of the invention at least one supporting surface has a spacer element on the side which is remote from the other supporting surface.

That spacer element which preferably has two abutment surfaces extending in mutually parallel relationship serves to provide an adaptation surface for a beam-forming element or a corresponding coupling device. A light beam issuing for example from a glass fibre is converted in the coupling device or in the beam-forming element into parallel light which then passes through the wave-modifying elements mounted on the support portion according to the invention. It is generally necessary for that purpose for the coupling device or the beam-forming element to be exactly positioned with respect to the support portion according to the invention. That is facilitated by the spacer element as the beam-forming element can be simply fitted, for example with suitable feet 9, on the abutment surface of the spacer element and fixed thereon and in that way passive adjustment of the beam-forming element with respect to the support portion is effected by a suitable choice of the spacer element. The spacer element could also comprise one or more screws or pins which for example are screwed into the supporting surfaces and the head of which serves as an abutment surface for the coupling device.

The spacer element advantageously has a through passage on the side towards the supporting surface, in which the optical element is arranged. In other words the spacer element surrounds the optical element or the wave-modifying element at the sides so that it is protected from external intrusions.

The spacer element preferably comprises a precision film.

In another alternative embodiment the spacer element comprises at least one pin which extends through both supporting surfaces. In that way a single spacer pin makes it possible to afford a spacer element on both supporting surfaces.

In a further preferred embodiment the spacer element and the support portion are of an integral nature. That has the advantage that adjustment and possibly fixing of the spacer element with respect to the support portion is not necessary.

In a further particularly preferred embodiment there are at least three supporting surfaces which are in mutually parallel relationship. That measure makes it possible to implement markedly more complex structures with wave-modifying elements which in the state of the art could be implemented only at a high level of adjustment complication and expenditure.

Narrow-band mirrors are advantageously used as the wave-modifying elements.

In a particularly preferred embodiment the support portion according to the invention is used in a multiplexer/demultiplexer device or in a beam splitter.

The method according to the invention for producing a support portion for mounting at least two wave-modifying elements comprises the following steps:

selecting a material block having an upper and a lower surface, providing one or more through bores or through passages which open in the upper or lower surface in openings so that the through passages connect the upper and lower surfaces together, and producing at least two supporting surfaces which extend in mutually parallel relationship, wherein the one supporting surface is arranged on the upper surface and the other supporting surface is arranged on the lower surface. In that case the openings or the through bores are so arranged that, when wave-modifying elements are disposed on the supporting surfaces, the beam path does not extend through the material block.

The supporting surfaces are advantageously produced after the through passages have been provided. That has the advantage that the surface quality of the supporting surfaces is not worsened again by the operation of providing the through passages.

In a particularly preferred embodiment of the method the supporting surfaces are produced with an averaged roughness depth $R_z$ (in accordance with DIN 4768) of less than 100 nm, preferably less than 50 nm, particularly preferably less than 20 nm.

A particularly desirable method provides that the supporting surfaces are produced with a cutting machining method, preferably by diamond turning or diamond milling. That makes it possible to achieve a very high level of surface accuracy.

It has been found that the parallelism of the supporting surfaces is particularly good if the supporting surfaces are produced by a turning method, wherein the material block is clamped on the periphery of a rotating device in such a way that the supporting surfaces to be produced are oriented perpendicularly to the axis of rotation of the rotating device. More specifically, the consequence of this is that all supporting surfaces can be produced in a single clamping operation. Deviations in terms of parallelism by virtue of adjustment errors when the tool is again clamped in the tool holder are avoided in that way.

It will be appreciated that the through bores do not have to directly form a connection between the openings of the two supporting surfaces. Rather, in a further particularly preferred method, it is provided that a channel which preferably extends substantially parallel to the supporting surfaces is provided in the block. That channel can comprise for example a recess or a milled pocket. In that way the through bores can be oriented substantially perpendicularly to the supporting surfaces, whereby the operation of producing the through bores and thus the openings of the supporting surfaces is facilitated. The beam path then extends for example from the first supporting surface through a first through bore into the channel and from there by way of a second through bore to the second supporting surface.

Advantageously at least one wave-modifying element is disposed on a supporting surface of the support portion and it is then fixed in that position to produce an optical modifier.

In a preferred embodiment the fixing operation is effected with a bonding agent, preferably with adhesive.

In a further particularly preferred embodiment the material block is selected from an elastically and/or plastically deformable material. The wave-modifying elements are then advantageously fixed on the supporting surfaces of the support portion under a given contact pressure. That has the advantage that substantially punctiform irregularities which are possibly present in the supporting surfaces and/or the surface of the wave-modifying elements press into the plastically and/or elastically deformable material and thus a higher level of angular accuracy can be achieved.

BRIEF DESCRIPTION OF THE DRAWINGS

Further advantages, features and possible uses of the present invention will be clearly apparent from the description hereinafter of preferred embodiments and the Figures relating thereto, in which:

FIGS. 3a to 3k show a third embodiment of the invention,

FIGS. 6a to 6k show a sixth embodiment of the support portion according to the invention with three supporting surfaces.

DETAILED DESCRIPTION OF THE INVENTION

Figure 1A:
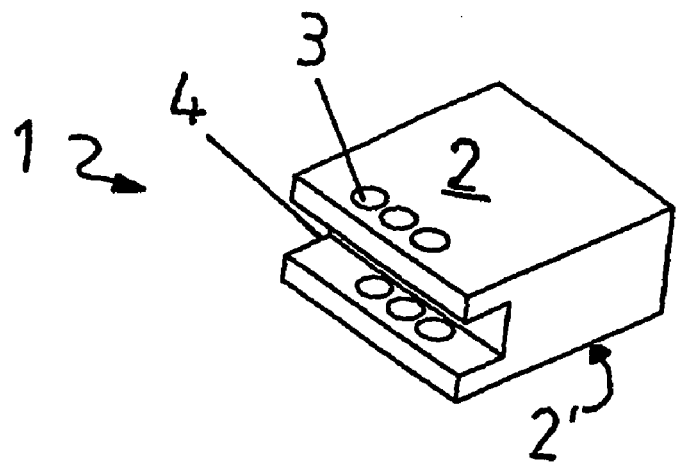
FIGS. 1a to 1g show various views of a first embodiment of the invention.

FIG. 1a shows a first embodiment of a support portion 1 according to the invention. The support portion 1 has an upper supporting surface 2 and a lower supporting surface 2'. The two supporting surfaces 2, 2' are connected together by the side surface of the support portion 1. At one side the support portion 1 has a channel or a recess which here is in the form of a milled pocket. In the illustrated embodiment the two supporting surfaces 2, 2' each have three through bores 3 which extend from the supporting surface 2 or 2' into the channel 4. While the channel 4 extends substantially parallel to the supporting surfaces 2, 2', the through bores 3 are arranged substantially perpendicularly to the supporting surfaces 2 and 2'.

Figure 1B:
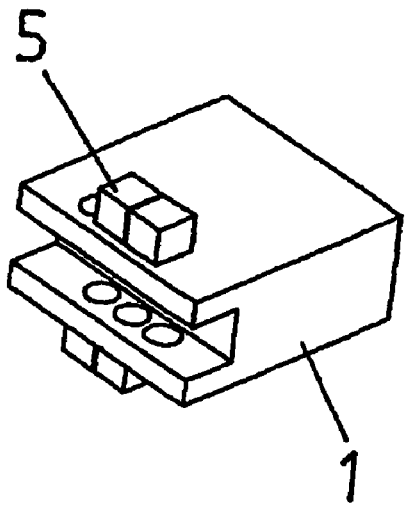

As can be seen from FIG. 1*b* the openings formed by the through bores 3 in the supporting surfaces 2 and 2' are provided for wave-modifying elements 5 to be positioned on the supporting surfaces 2 and 2' in such a way that they at least partially and preferably completely cover over the openings. The wave-modifying element can be for example a narrow-band mirror which reflects all wavelengths, apart from a narrow band which includes at least one wavelength channel but possibly also a plurality of wavelength channels. The wavelengths in the narrow band in contrast can be transmitted.

Thus the arrangement of FIG. 1*b* could be used for example for coupling four channels out of a signal. For that purpose for example the light signal could be radiated through the top left opening through the upper supporting surface so that it passes through the milled pocket 4 and the bottom left opening and impinges on the left-hand wave-modifying element which is fixed to the lower supporting surface 2'. If that is a narrow-band mirror, only one wavelength channel transmits here while all other wavelength channels are reflected back through the bottom left opening upwardly through the milled pocket 4 and through the top central through bore 3 on to the top left wave-modifying element 5. Here too once again only one wavelength channel is transmitted while all other wavelengths are reflected downwardly in the direction of the right-hand lower wave-modifying element. That process is continued until all remaining wavelength channels leave the device again through the lower right opening. The arrangement according to the invention of the through bores 3 in combination with the milled pocket 4 ensures here that the beam path is free of material, that is to say, no attenuation of the signal or wavelength-dependent effects occur. The parallel arrangement of the two surfaces 2 and 2' however nonetheless ensures that the wave-modifying elements 5 can be easily positioned on the supporting surfaces 2 and 2' without subsequent fine adjustment being required. Adjustment is thus effected passively, that is to say simply by suitably arranging the openings formed by the through bores 3, on the plane-parallel supporting surfaces 2 and 2'. The device is adjusted after the wave-modifying elements 5 are mounted on the supporting surface 2 and 2' respectively, in which case a suitable contact pressure force is possibly advantageous.

Figure 1C:
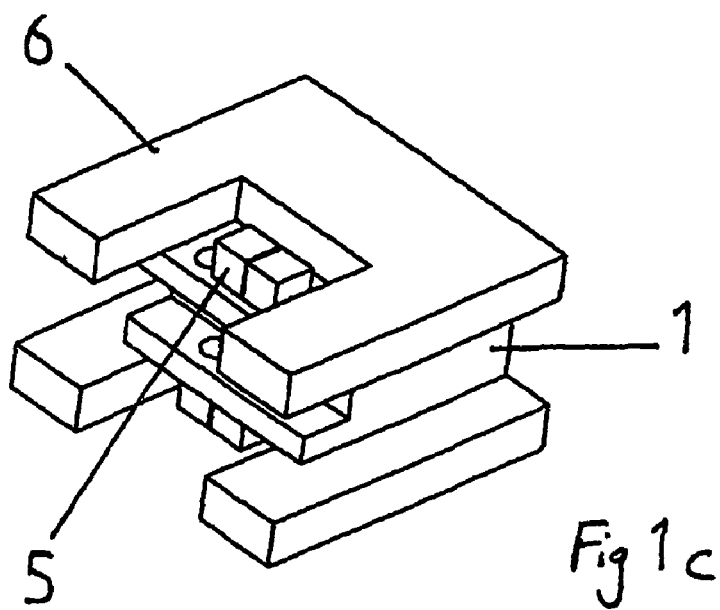

It will be seen from FIG. 1*c* that a spacer element 6 is also positioned in each case on the supporting surfaces 2 and 2', which has a recess in which the wave-modifying elements 5 are disposed. That spacer element 6 also has two plane-parallel contact surfaces and serves as an adaptation surface for adjustment of a corresponding coupling device. The spacer elements 6 are preferably of a thickness which exceeds the height of the wave-modifying elements 5 so that, if a flat element were to be laid on the spacer element 6, it does not come into engagement with the wave-modifying elements 5.

Figure 1D:
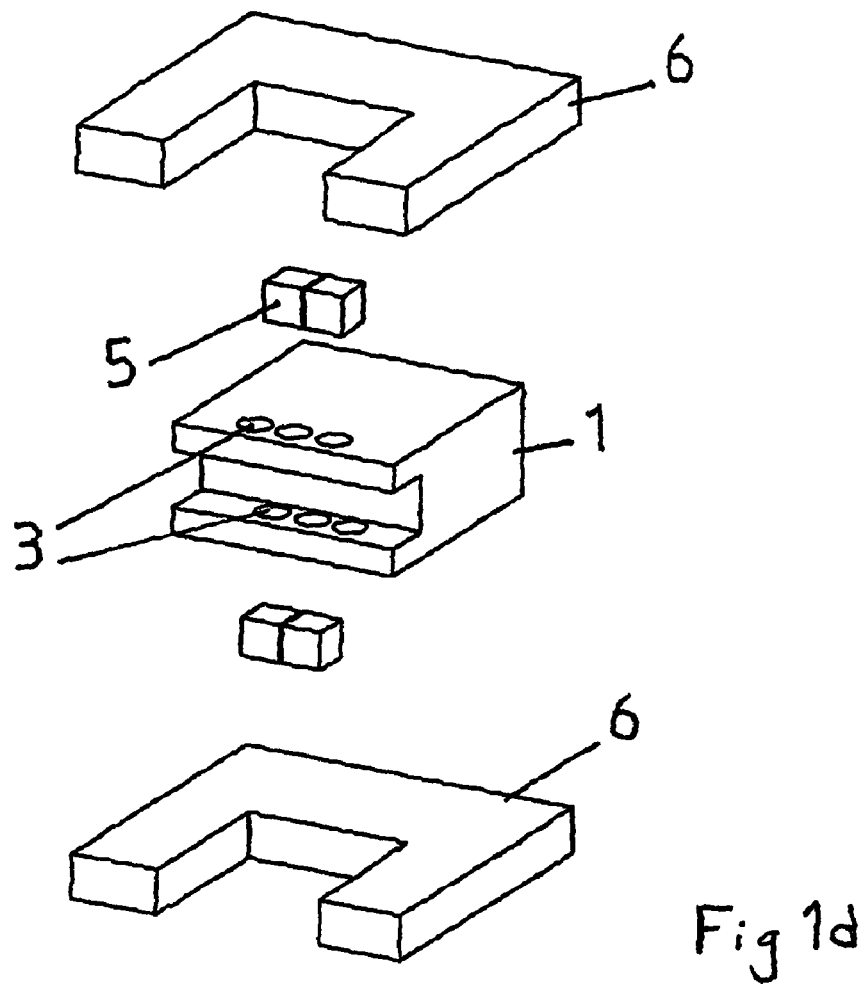
Figure 1E:
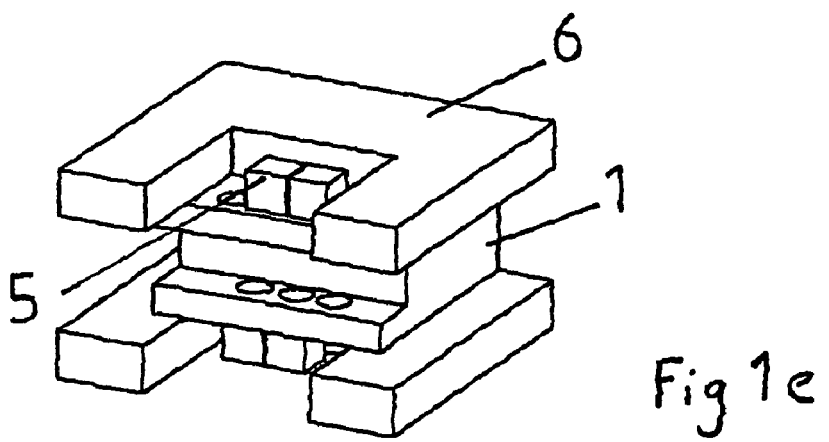

FIGS. 1*d* and 1*e* show still further views of the support portion 1 according to the invention with wave-modifying elements 5 and spacer elements 6.

Figure 1F:
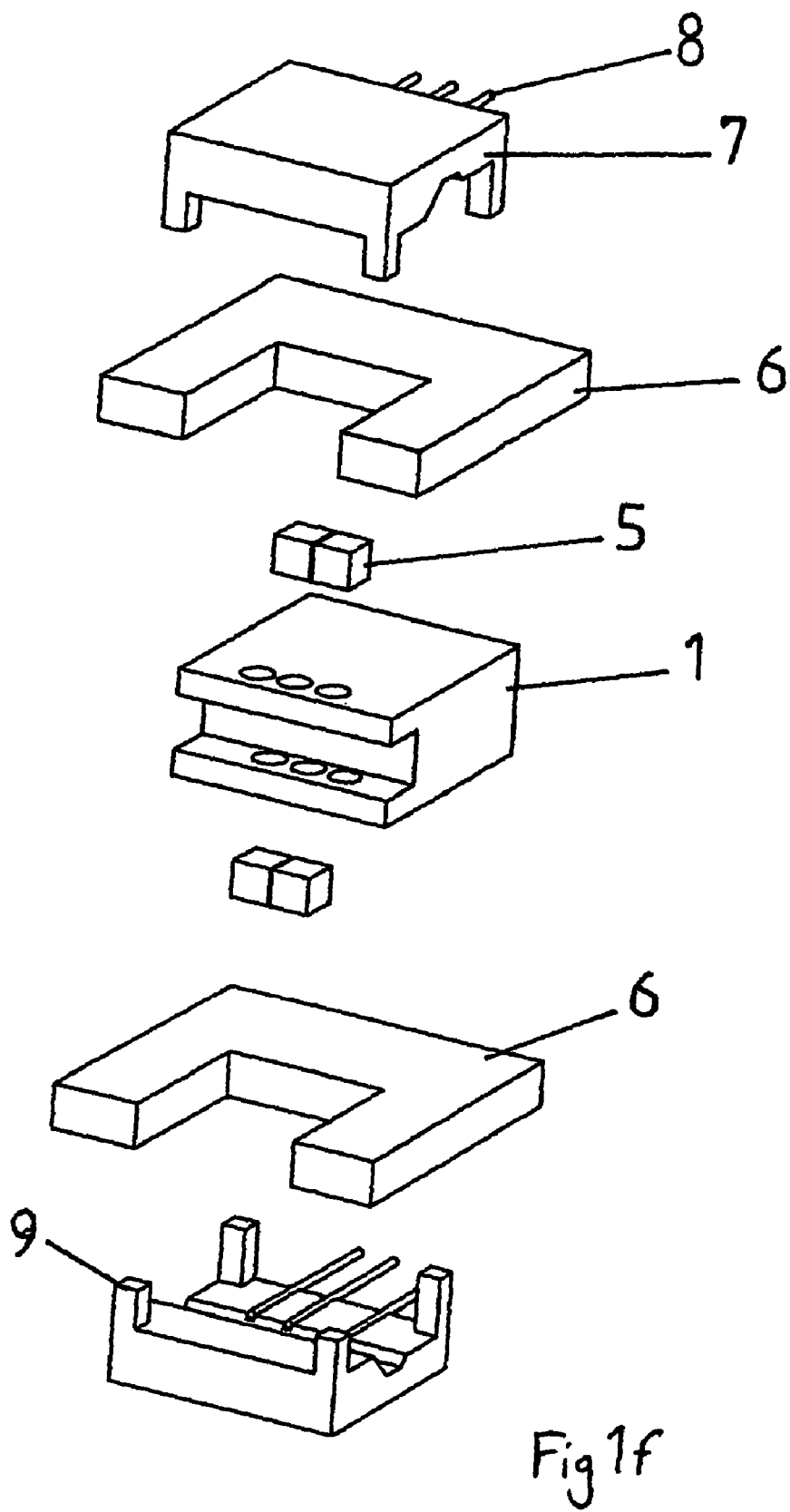
Figure 1G:
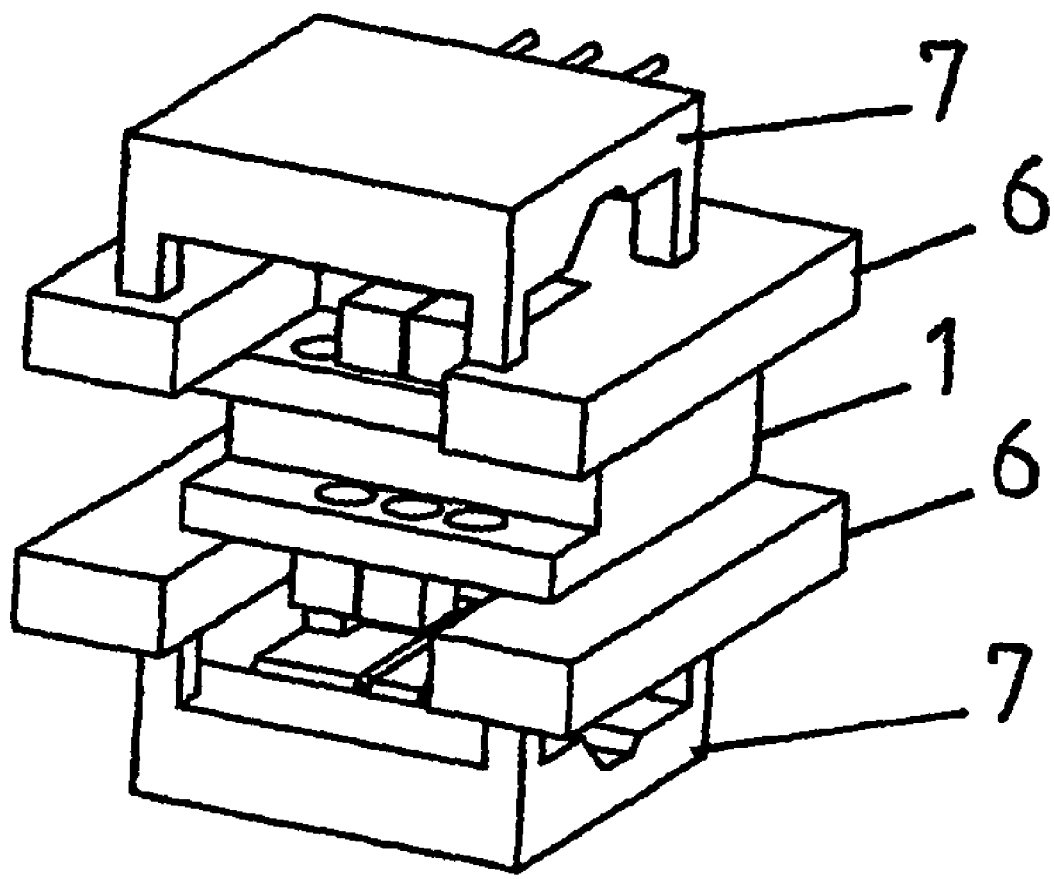

FIGS. 1*f* and 1*g* show an exploded view and a perspective view of the support portion 1 according to the invention together with two coupling devices 7. The coupling devices 7 serve to couple light signals which are provided for example by way of glass fibres 8, into the support portion 1, as parallel light, in such a way that the beam configuration passes through the individual wave-modifying elements 5.

The coupling device 7 can in principle be of just any desired configuration. Thus it is possible to envisage for example coupling devices with lens systems, for example gradient index lenses. However, in a particularly preferred feature a coupling device as is already known from WO 02/21733 is used here. Such a coupling device has a curved reflecting surface so that the beam spread which occurs at the end of a glass fibre is at least partly compensated by the reflection at the curved surface which for example is in the form of a portion of a rotational paraboloid, a rotational ellipsoid or a rotational hyperboloid. The spacer element 6 serves to provide an adaptation surface for corresponding abutment surfaces of the coupling device 7, so that here too passive adjustment, that is to say adjustment only by applying the coupling device to the spacer element 6 and possibly pressing it thereagainst, can be effected.

FIG. 1*g* shows a perspective view illustrating how for example a demultiplexer/multiplexer system can be implemented in a very small space. Expensive and complicated adjustment is not necessary by virtue of the configuration according to the invention of the support portion 1 as well as the spacer elements 6.

Figure 2A:
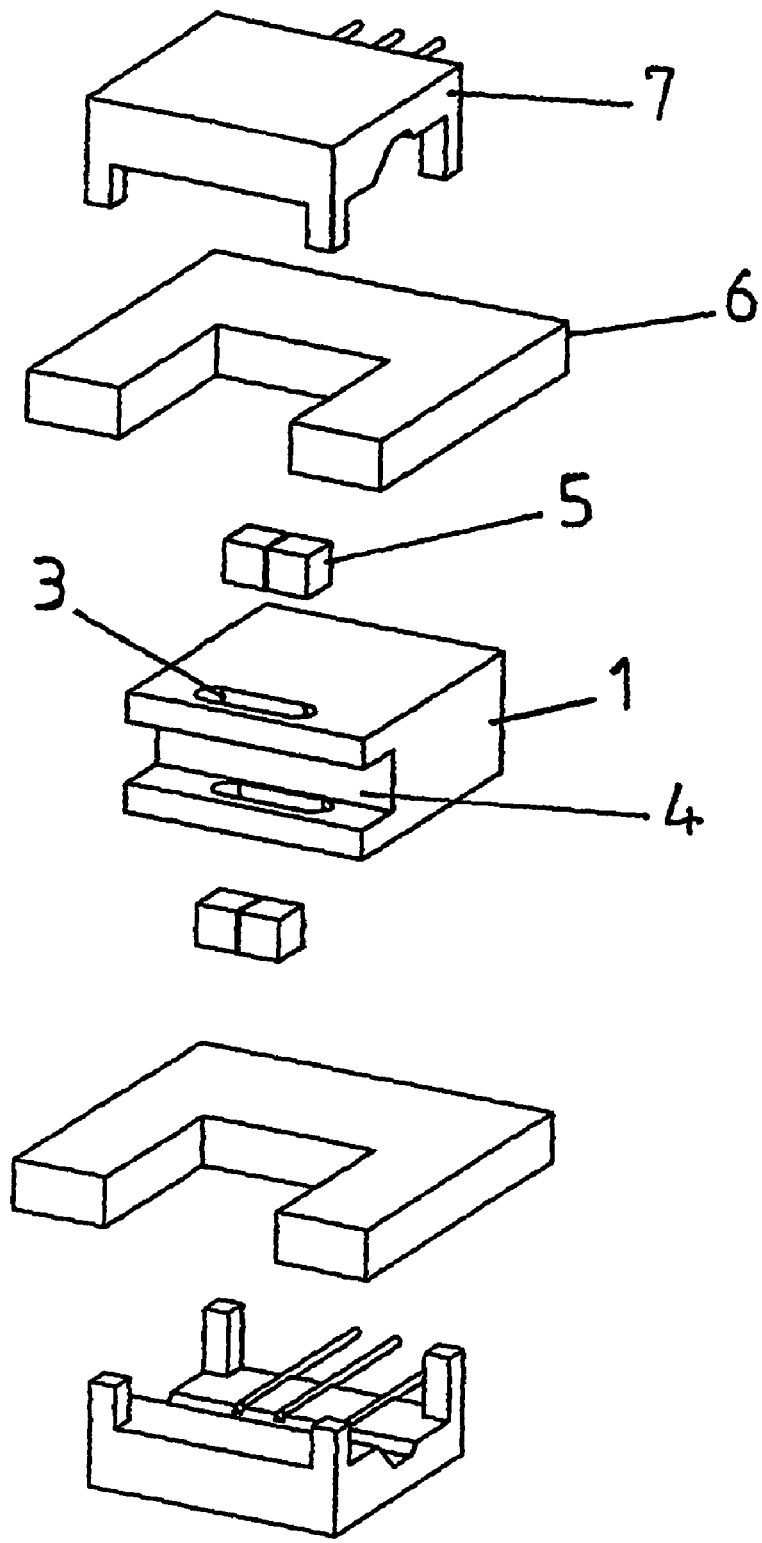
FIGS. 2a and 2b show a second embodiment of the invention.
Figure 2B:
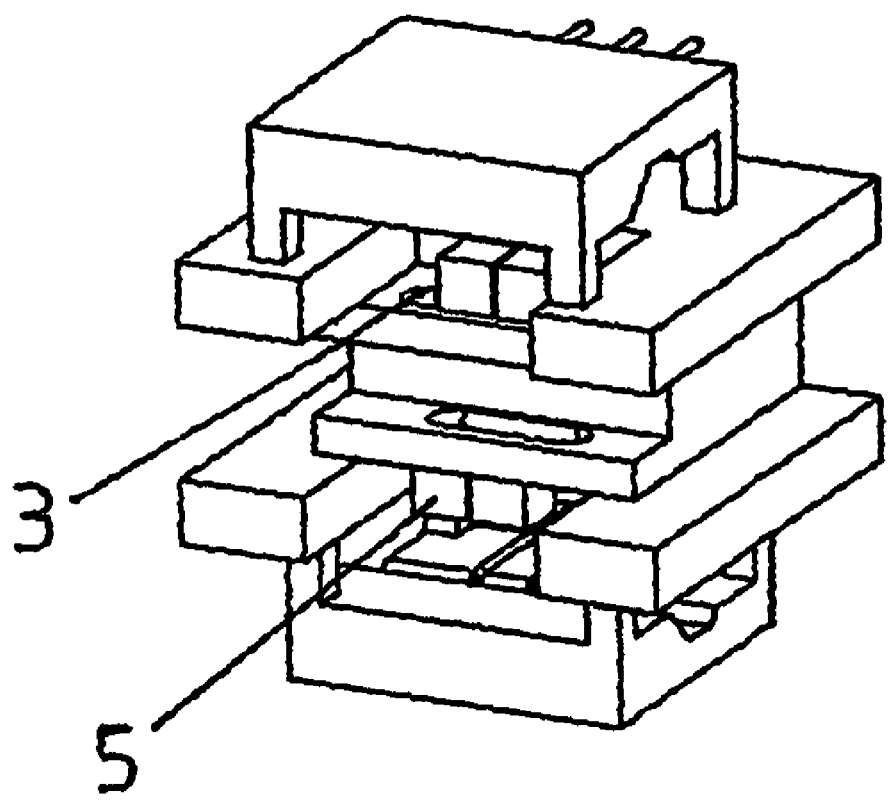

FIGS. 2*a* and 2*b* show an alternative embodiment. The only difference between the embodiment shown in FIGS. 2*a* and 2*b*, in relation to that shown in FIGS. 1*a* to 1*g*, is that the through bore 3 is here in the form of a slot. In other words, in this case each wave-modifying element 5 does not have its own opening on the supporting surface 2 or 2' respectively, but each wavelength element 5 covers over a part of the opening. At this juncture it should be expressly pointed out that the opening and also the through bore 3 can in principle adopt any desired shape. The only essential point is that a suitable supporting region is made available on the supporting surfaces 2 and 2' respectively for the wave-modifying elements 5 so that the wave-modifying elements 5 can be positioned simply by being laid on or placed on the supporting surfaces 2 and 2' respectively.

At this juncture it should be expressly pointed out that the wave-modifying elements 5 do not necessarily have to be fixed on the outwardly disposed supporting surfaces 2 and 2'. It would be possible for example that the wave-modifying elements 5 could be mounted to the upper and lower side surface of the recess 4, which surfaces would then have to be in the form of parallel supporting surfaces.

It is therefore for example not absolutely necessary for a channel 4 extending parallel to the supporting surfaces 2 and 2' to be provided. It would be entirely sufficient if only inclinedly extending through bores 3 through the support portion 1 are arranged in such a way that they connect the two supporting surfaces 2 and 2' in a suitable fashion in such a way that the beam path can extend completely in the material-free space. It will be noted however, as already stated above, that the embodiment with the channel 4 and with through bores 3 oriented substantially perpendicularly to the supporting surfaces enjoys advantages in terms of production engineering.

FIGS. 3*a* to 3*e* show a third embodiment of the support portion 1. As can be seen from the perspective view of FIG. 3*a* in this case also the support portion 1 has through bores 3 which extend substantially perpendicularly to the supporting surfaces 2 and 2'. Here now no channel in the form of a milled pocket is provided in substantially parallel relationship with the supporting surfaces 2 and 2', but only one channel in the form of a connecting bore 4. It can be clearly seen from the sectional view shown in FIG. 3*b*, taken along line A-A in FIG. 3*c*, that the openings formed by the through bores 3 in the upper supporting surface 2 are displaced with respect to the openings formed by the through bores 3 in the lower supporting surface 2'. That is necessary so that a light beam entering for example through the top left opening 3 is reflected at a narrow-band filter mounted at the bottom left opening, in such a way that the reflected light beam passes through the top central opening.

Figure 3A:
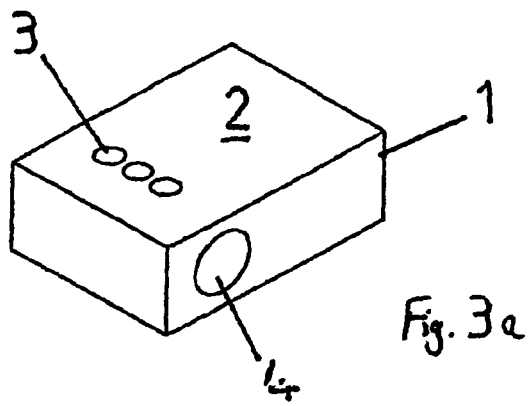
Figure 3C:
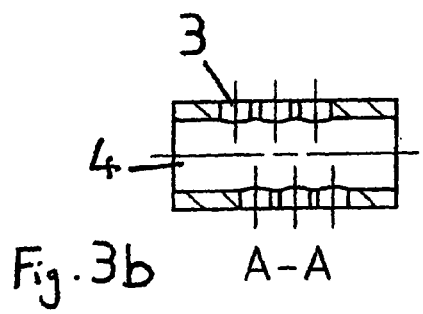
Figure 3C:
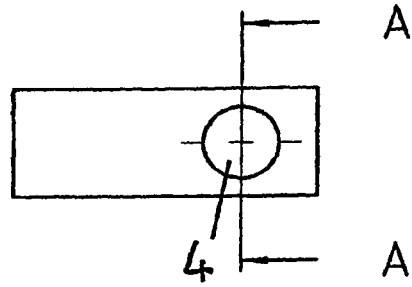
Figure 3D:
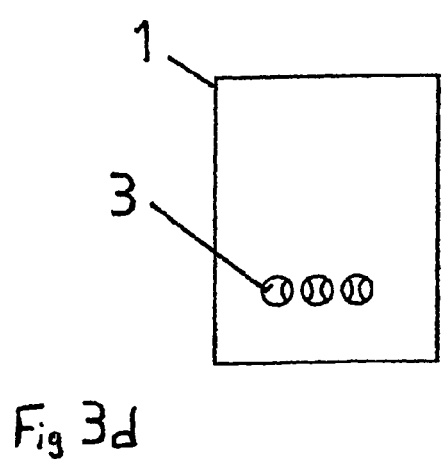
Figure 3E:
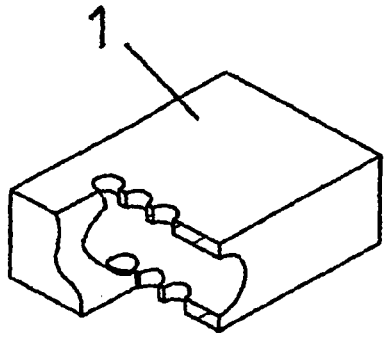
Figures 3F, 3G:
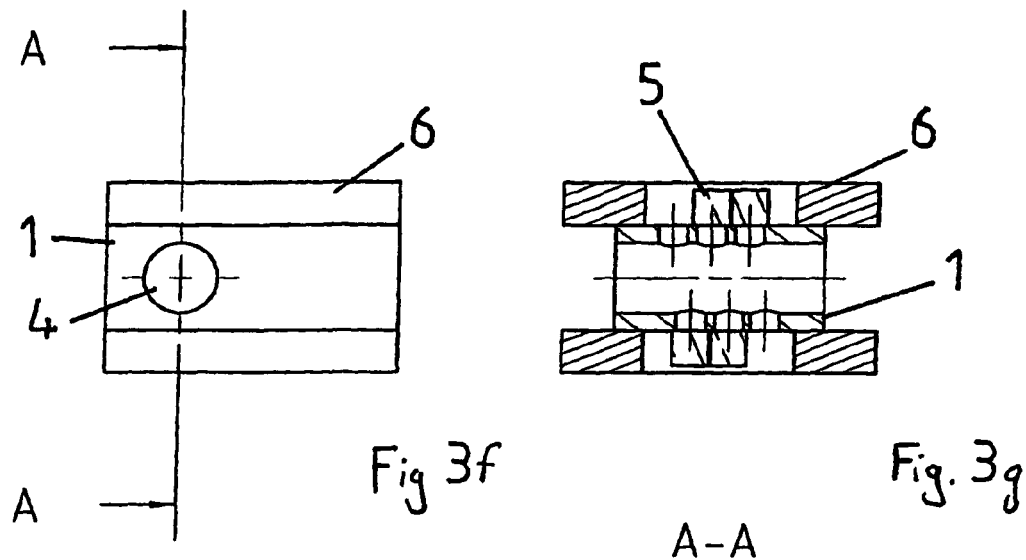
Figure 3H:
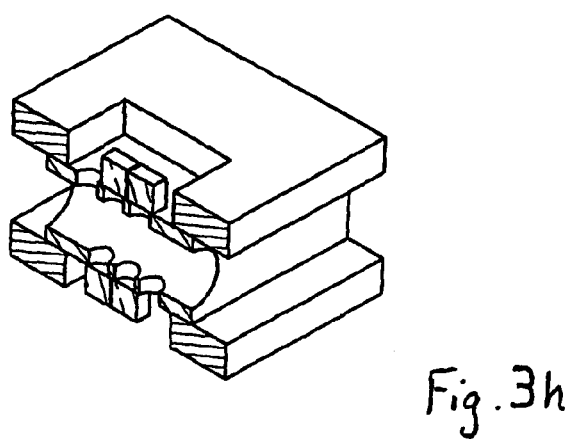

FIGS. 3f to 3h show further views of this third embodiment of the support portion 1, with spacer elements 6 again being fitted here. It can be clearly seen from the view in FIG. 3g that the height of the spacer elements 6 was so selected that the wave-modifying elements 5 do not project beyond the outer surface of the spacer elements 6.

Figure 3I:
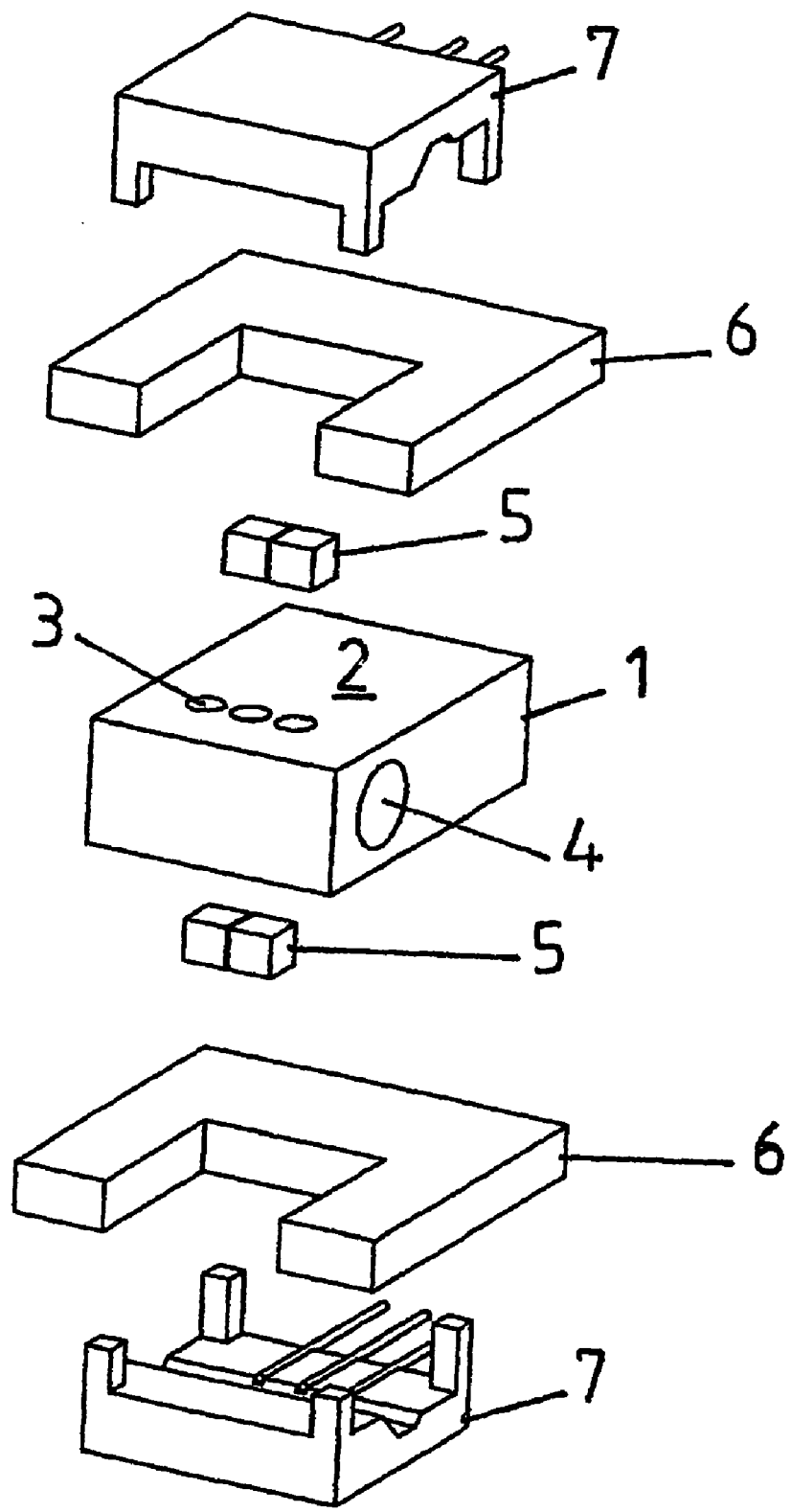
Figure 3K:
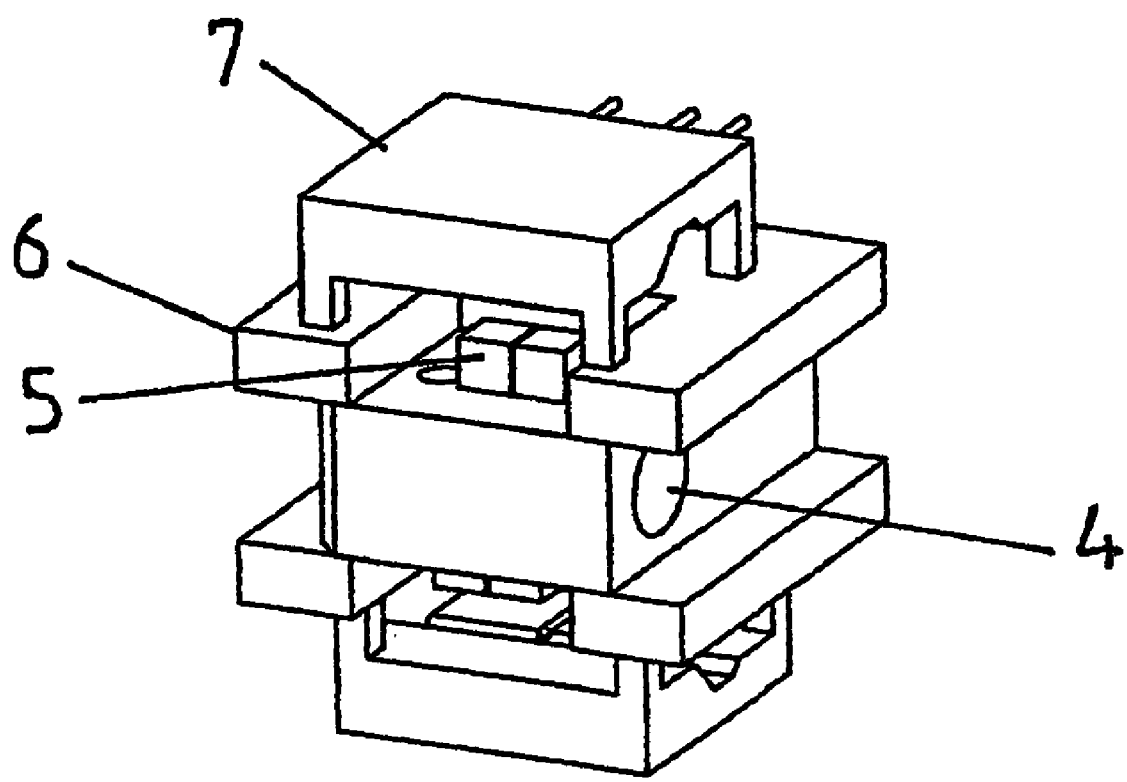
Figure 4A:
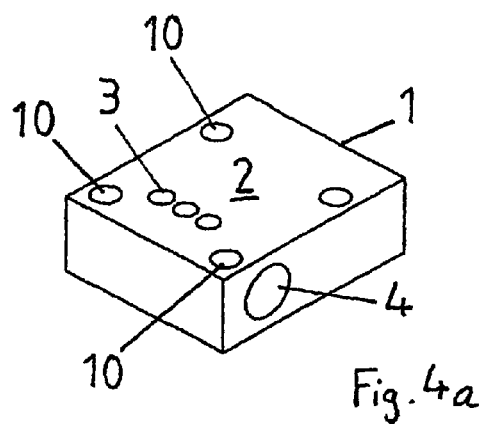
FIGS. 4a to 4g show a fourth embodiment of the invention.
Figure 4B:
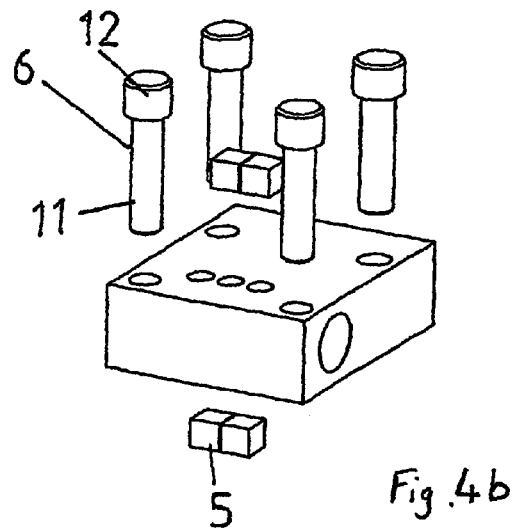
Figure 4C:
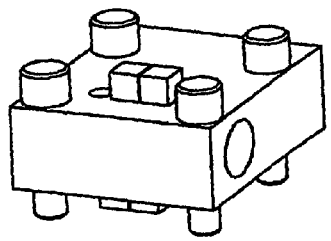
Figure 4D:
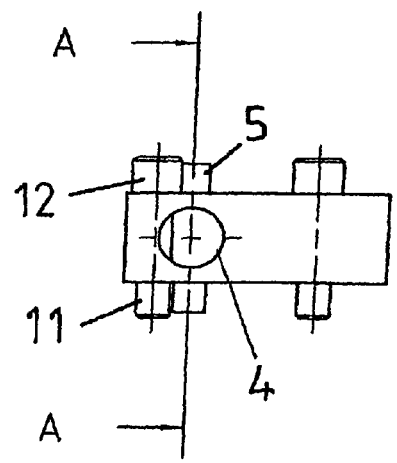
Figure 4E:
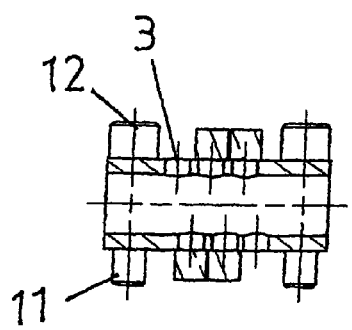
Figure 4F:
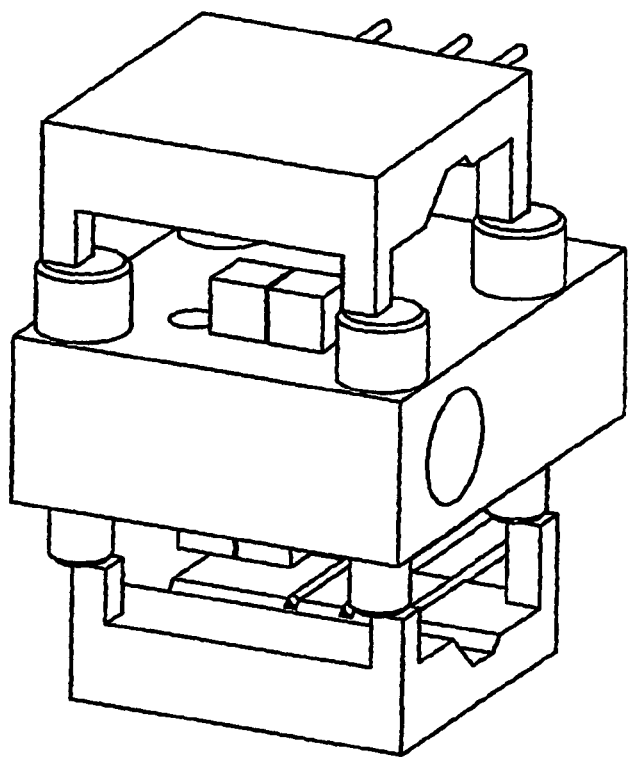
Figure 4G:
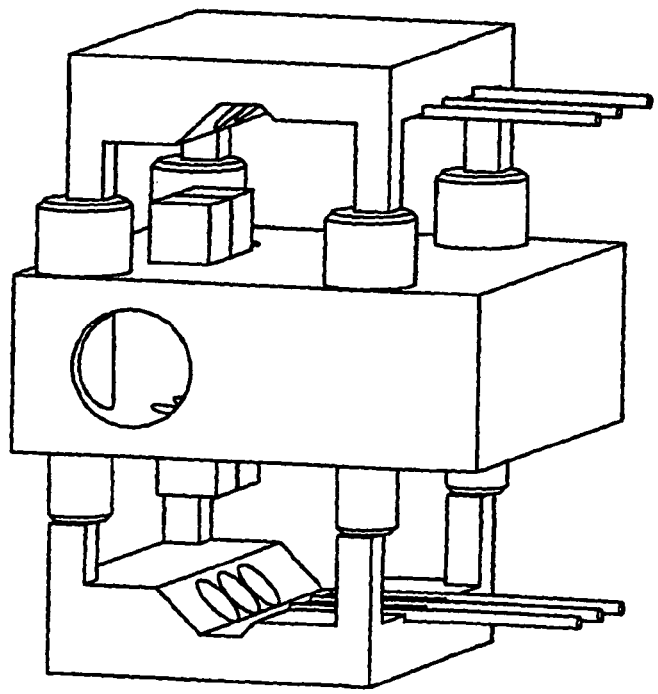

FIGS. 3i and 3k again show an exploded view and a perspective view of a demultiplexer/multiplexer system with the support portion 1 according to the invention, of the third embodiment.

The embodiments illustrated hitherto used a substantially plate-shaped or film-shaped spacer element 6. Thus it is for example possible for the spacer element 6 to be produced from a precision film by means of laser cutting.

The spacer element can however also be of a completely different configuration, as can be seen by way of example by means of the fourth embodiment shown in FIGS. 4a to 4g. It can be clearly seen from FIGS. 4a to 4d that here the support portion 1 only differs from the support portion of the embodiments of FIGS. 3a to 3k, in that there are provided bores 10 which extend perpendicularly to the supporting surfaces 2, 2' through the support portion 1. As can be clearly seen in particular from FIGS. 4b to 4d, the spacer element 6 here comprises four pins which are fitted through the additional bores 10. The pins have a narrow portion 11 whose outside diameter approximately corresponds to the diameter of the bores 10. The pins have a thicker head 12 which is of such a configuration that that part cannot slip through the bores 10. The elongate portion 11 and the head 12 are of such a configuration that, in the condition of being fitted into the bore 10, as shown in particular in FIGS. 4b and 4e, the elongate portion 11 and the head 12 respectively project beyond the supporting surfaces 2 and 2' to such an extent that the wave-modifying elements 5 do not project beyond the spacer element 6. As can be seen from FIGS. 4f and 4g, the pins 6 are positioned in such a way that they afford a suitable contact surface for the coupling device 7.

In an alternative embodiment the pins can be of a different length. That can be advantageous in particular when the coupling device 7 and the support portion 1 are made from a different material and therefore involve different thermal coefficients of expansion. As the coupling device 7 is fixed on the pins serving as the spacer elements 6, bending of the coupling device 7 can occur—caused by changes in temperature—if the support portion 1 and the coupling device 7 contract or expand to different degrees for example in the horizontal direction in FIG. 4g. That bending can give rise to disadjustment of the coupling device 4 and the support portion 1 so that the parallel light which leaves the coupling device 7 is no longer optimally oriented. A suitable choice in respect of the lengths of the pins makes it possible to compensate for that disadjustment due to the different expansion characteristics—in a vertical direction. As an alternative thereto the pins could also be made from different material so that the differing coefficients of expansion of the different materials provide for compensation of the expansion effect.

Figure 5A:
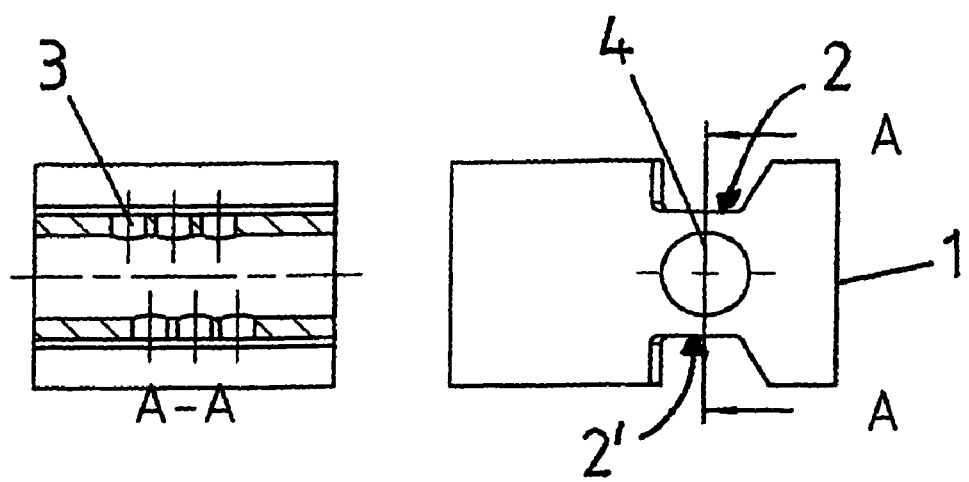
FIGS. 5a to 5c show a fifth embodiment of the support portion according to the invention.
Figure 5A:
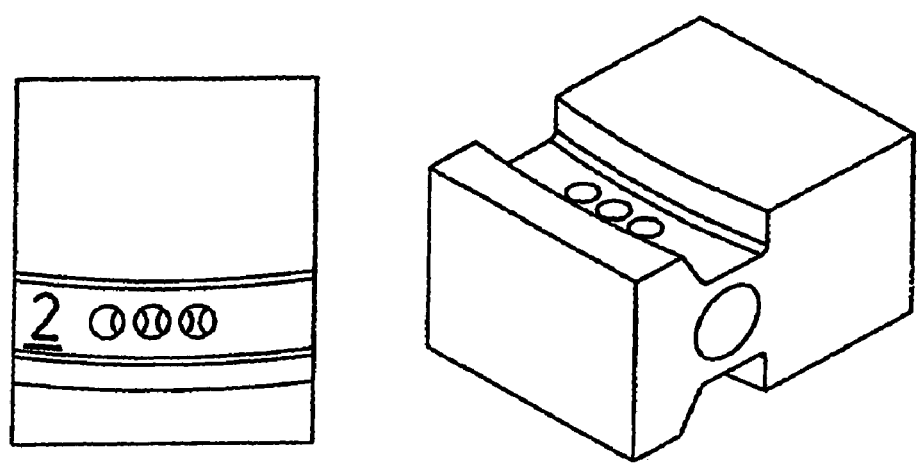
Figure 5A:
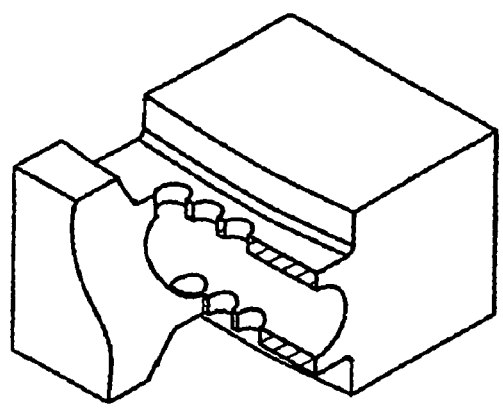
Figure 5B:
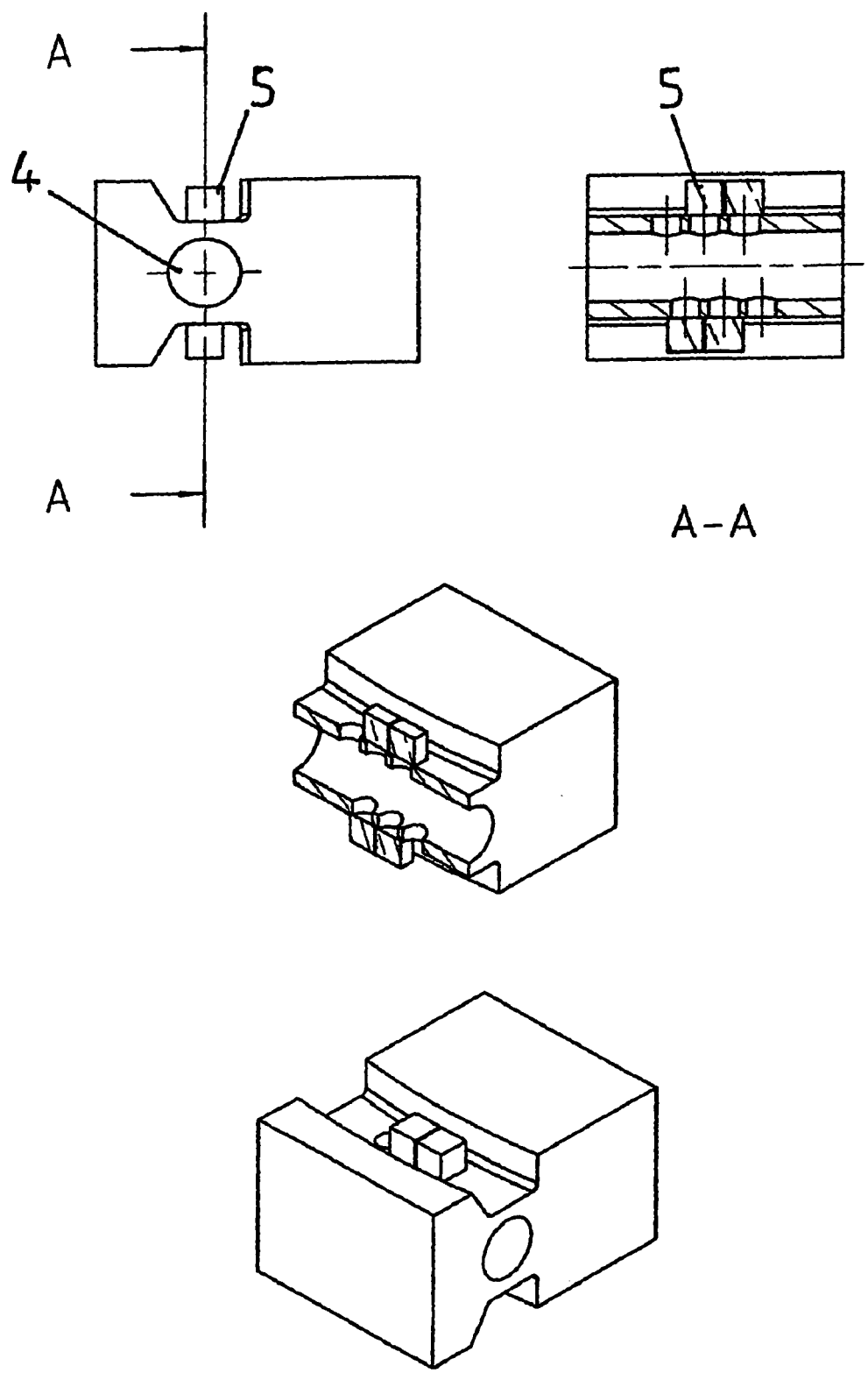
Figure 5C:
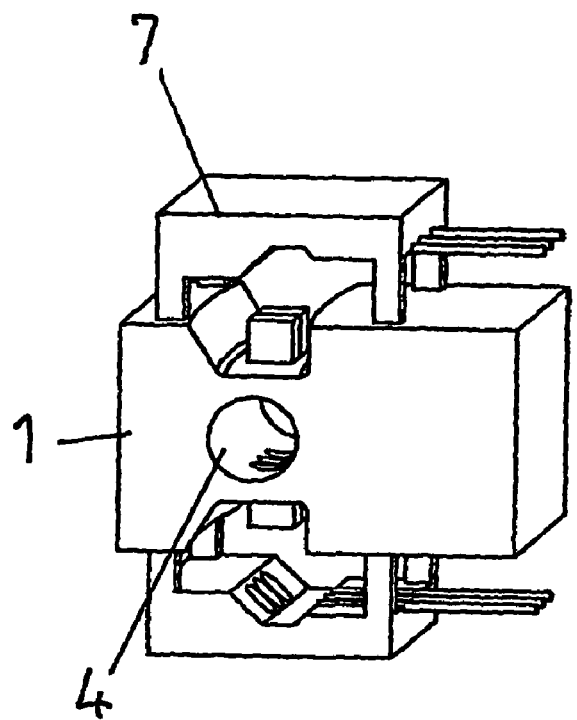
Figure 5C:
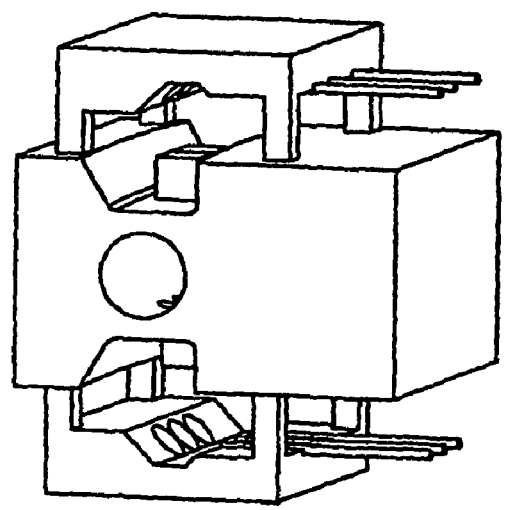

FIGS. 5a to 5c show various views of a further embodiment of the support portion 1. In this case also the support portion 1 has an upper and a lower surface which however do not serve as supporting surfaces 2, 2' but as a spacer element. The actual supporting surfaces 2, 2' are formed by two milled recesses. The supporting surfaces 2 and 2' are thus set back somewhat with respect to the upper and lower surfaces of the support portion 1. The milled recesses or set-back portions are shaped in accordance with a portion of a circle, which affords advantages in terms of production engineering, as will be described in greater detail hereinafter.

The wave-modifying elements are fitted into the milled recesses, as can be seen from the views in FIG. 5b. The milled recesses are of such dimensions that, when the wave-modifying elements are applied to the supporting surfaces 2 and 2' respectively, they do not project beyond the upper and lower surfaces respectively of the support portion 1. In this embodiment therefore the support portion 1 and the spacer element 6 are produced integrally. The illustrations in FIG. 5c show two perspective views of a multiplexer/demultiplexer system with such a support portion 1.

In the embodiments illustrated hereinbefore the support portion 1 was of such a configuration in each case that only two supporting surfaces 2 and 2' extending in mutually parallel relationship were provided. It is however possible for the concept according to the invention to be further developed in such a way that more than two supporting surfaces 2, 2' are provided.

Thus, FIGS. 6a to 6k show a first embodiment which has three supporting surfaces. As can be seen in particular from FIG. 6a, here the support portion 1 comprises an upper support portion and a lower support portion. The upper support portion is here substantially identical to the support portions described with reference to FIGS. 1 to 5. The lower support portion here additionally has a recess 13 which makes it possible for a wave-modifying element 5' fixed to the lower supporting surface of the upper support portion to sink into the body of the lower support portion. That can be particularly clearly seen from the sectional view in FIG. 6d or the perspective sectional view in FIG. 6e. The first supporting surface is thus formed by the upper supporting surface of the upper support portion while the second supporting surface is formed by the lower supporting surface of the upper support portion and the third supporting surface is formed by the lower supporting surface of the lower support portion. The upper and lower support portions each have two mutually parallel supporting surfaces, wherein the lower supporting surface of the upper support portion rests on the upper supporting surface of the lower support portion.

Figure 6A:
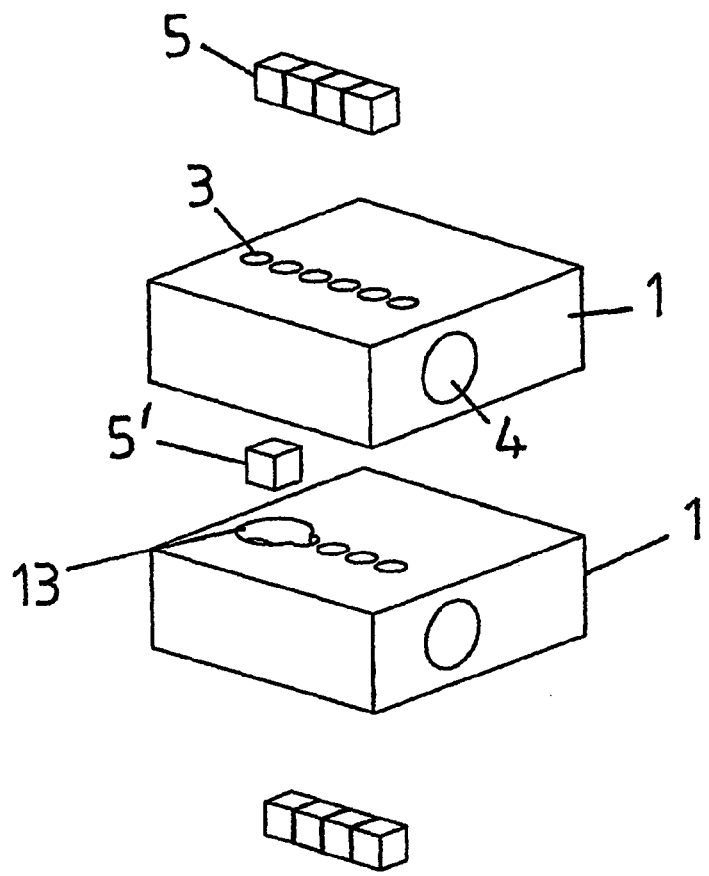
Figure 6B:
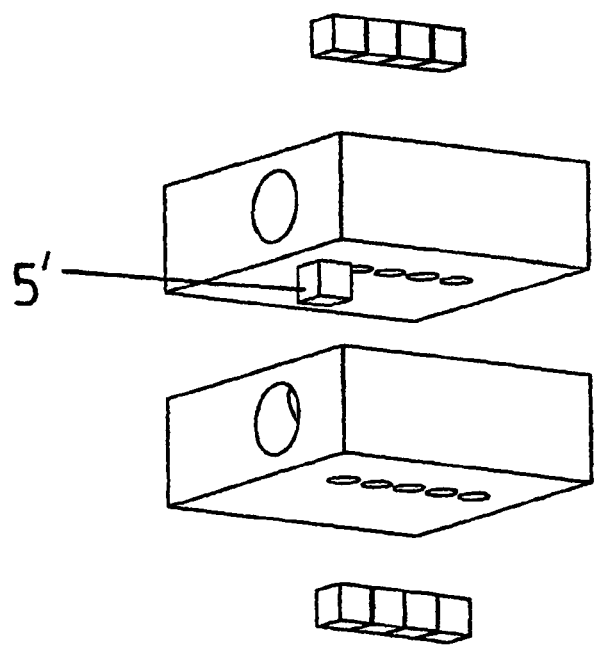
Figures 6C, 6D:
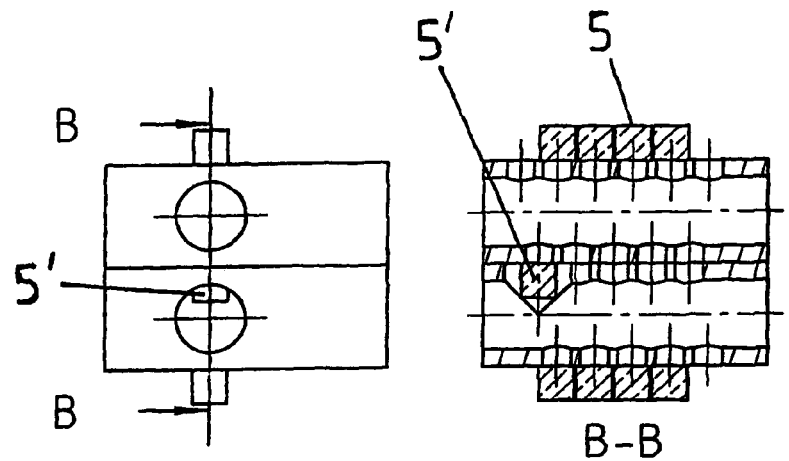
Figure 6E:
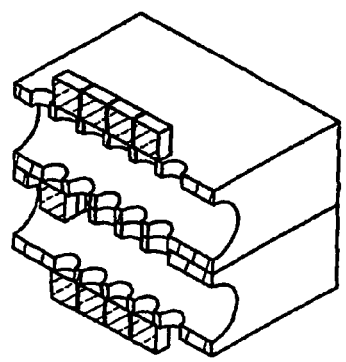
Figure 6F:
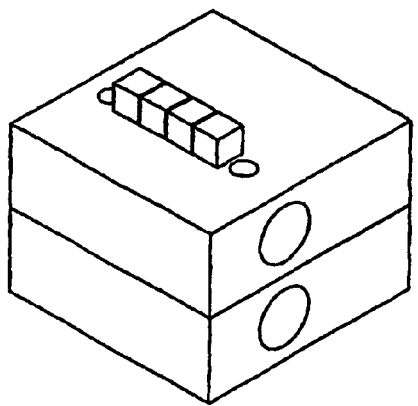
Figures 6G, 6H:
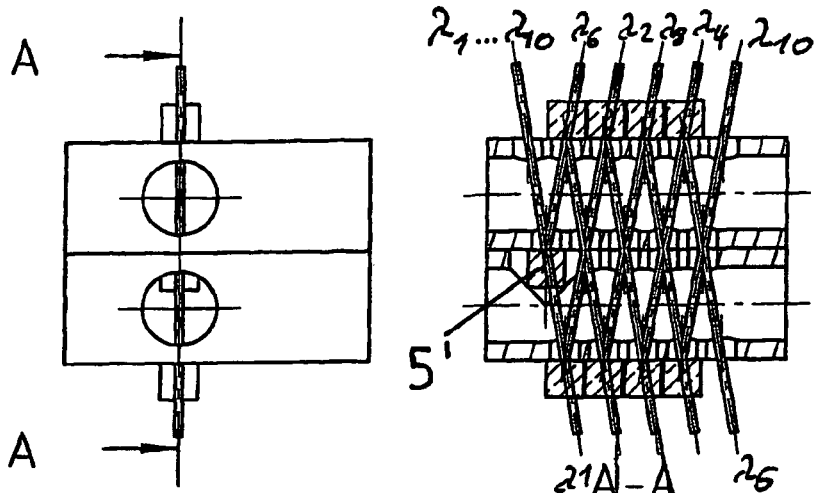
Figure 6I:
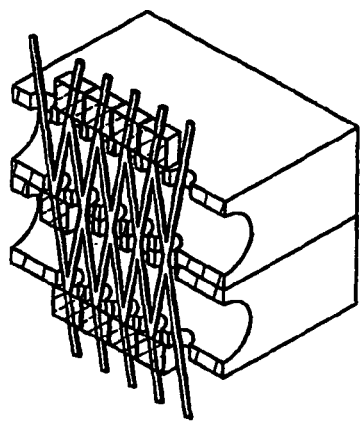
Figure 6K:
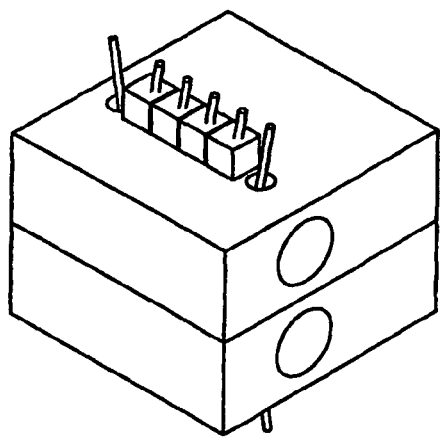
Figure 7A:
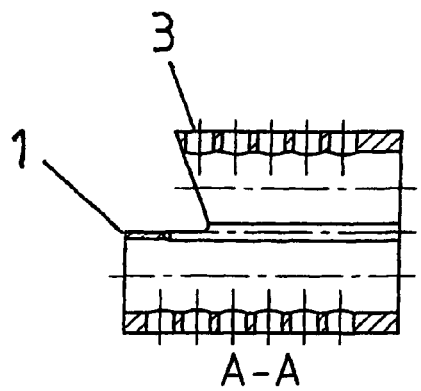
FIGS. 7a to 7o show a seventh embodiment of the support portion according to the invention with three supporting surfaces.
Figure 7B:
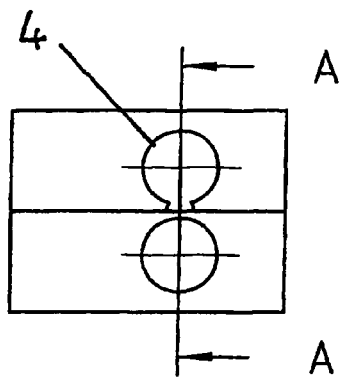
Figure 7C:
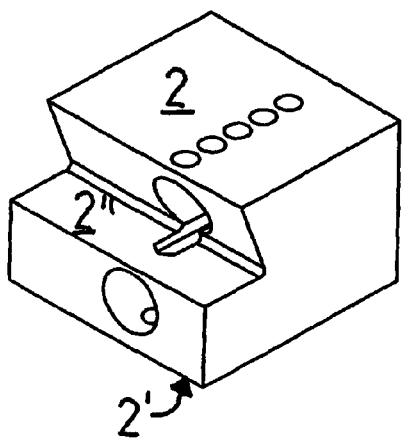
Figure 7D:
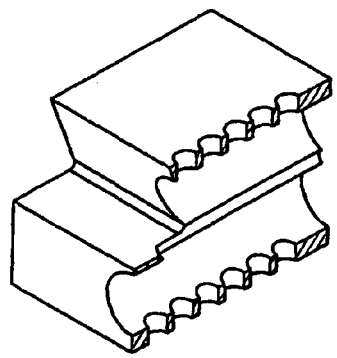
Figure 7E:
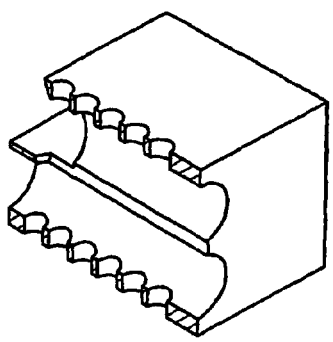
Figure 7G:
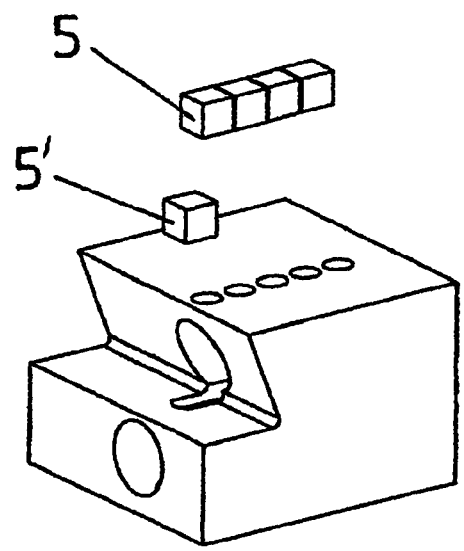
Figure 7G:
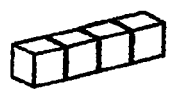
Figure 7G:
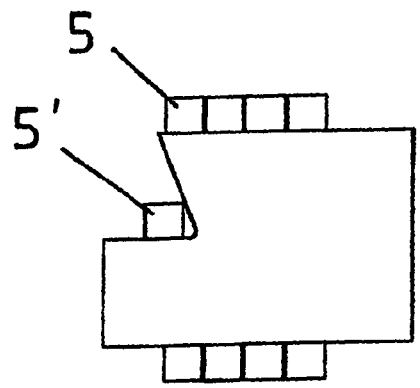
Figure 7H:
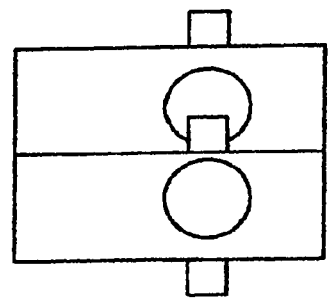
Figure 7I:
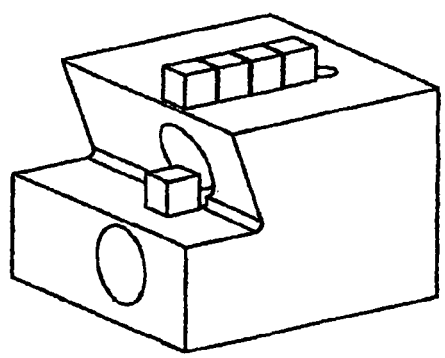
Figure 7K:
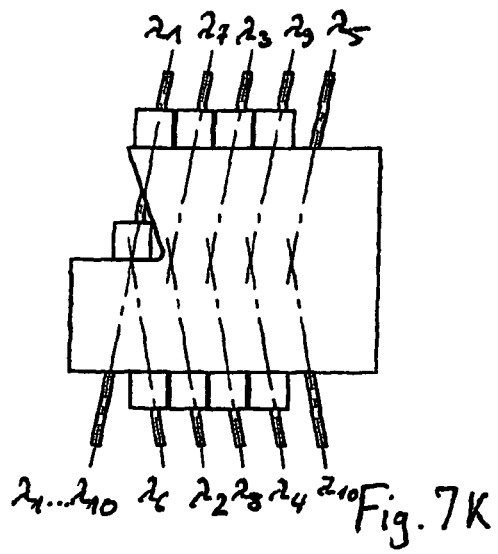
Figure 7L:
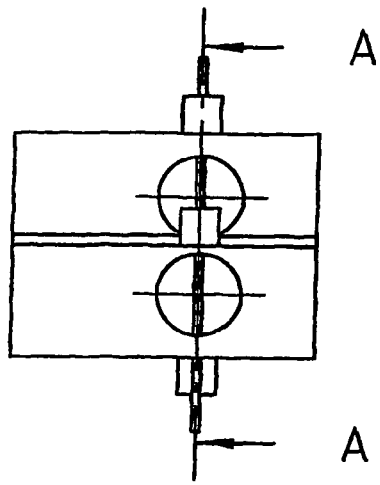
Figure 7M:
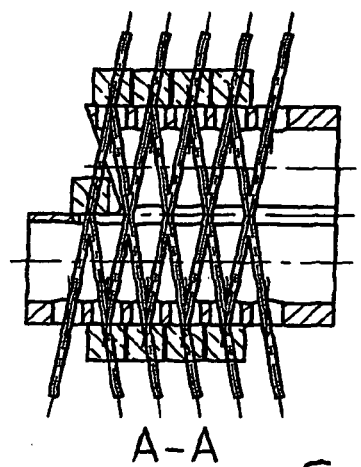
Figure 7N:
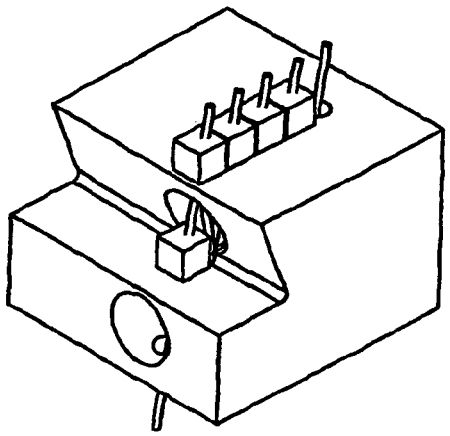
Figure 7O:
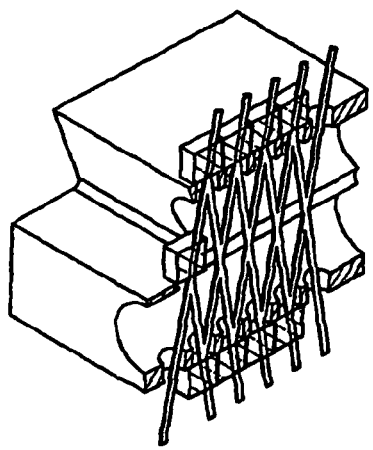

In order to clarify the range of use of such a structure, the beam path configuration is diagrammatically illustrated in FIGS. 6g to 6k. For example, as shown in FIG. 6h, a light beam with the wavelength channels $\lambda 1$ to $\lambda 10$ could be coupled in from top left. The light beam then impinges on the wave-modifying element 5' of the intermediate surface. It can be of such a nature that it passes the wavelength channels $\lambda 1$ to $\lambda 5$ while the wavelength channels $\lambda 6$ to $\lambda 10$ are reflected. The transmitted wavelength channels $\lambda 1$ to $\lambda 5$ then impinge on the left-hand wavelength-modifying element 5 of the lowermost supporting surface. In the illustrated embodiment the element 5 is such that it transmits the wavelength channel $\lambda 1$ while all other wavelength channels are reflected. The reflected beam (which contains the wavelength channels $\lambda 2$ to $\lambda 5$) then passes through the upper and lower openings respectively of the lower and upper support portions 1 respectively and impinges on the wavelength-modifying element which is the second element as viewed from the left, on the upper supporting surface. That wavelength-modifying element is of such a configuration that only the wavelength channel $\lambda 2$ is transmitted while all other wavelength channels, that is to say the wavelength channels $\lambda 3$ to $\lambda 5$ are reflected. The precise reflection and transmission conditions respectively can be clearly seen by reference to FIG. 6h.

This embodiment has a number of advantages. On the one hand, any reflection at a narrow-band mirror inevitably results in a certain degree of signal attenuation and—by virtue of slight angle tolerances in respect of the filters—also a slight angle error. Therefore, in an arrangement with only two surfaces which extend in mutually parallel relationship and on which the individual wave-modifying elements 5 are arranged, particularly in the case of high numbers of channels, it is inevitable that the signal of that channel which is last filtered out is markedly attenuated and—as the angle errors are added—has a major angle error. If for example a 10-channel multiplexer/demultiplexer with only two surfaces is to be constructed, then the signal which is last separated must be reflected at nine different filters. In the embodiment illustrated in FIGS. 6g to 6k, a maximum of five reflections are necessary so that a higher degree of angular accuracy and a lesser degree of signal attenuation can be achieved.

On the other hand—because of the frequency splitting effect caused by the wave-modifying element—markedly lower demands in respect of quality are made on the narrow-band filters as only a relatively small wavelength range has to be reflected. The costs of the structure can be reduced as a result.

FIGS. 7a to 7e show a further embodiment of a support portion 1 which has three supporting surfaces 2, 2', 2". This support portion 1 is made in one piece. At its one side the support portion 1 has a kind of step which has a supporting surface 2" for a further wave-modifying element. A respective row of through bores 3 is provided in the upper supporting surface 2 and the lower supporting surface 2'. They are connected to the channels 4 which extend parallel to the supporting surfaces 2, 2', 2". The illustrated embodiment has two channels 4 which extend transversely with respect to the beam direction and which are connected together by way of an aperture. As can be seen from FIGS. 7f to 7i, wave-modifying elements 5 which for example can be narrow-band mirrors are placed both on the upper supporting surface 2 and also on the lower supporting surface 2'. In addition a wave-modifying element 5' is laid on the step which forms the central supporting surface 2". A beam path configuration by way of example is diagrammatically illustrated in FIGS. 7k to 7o. It can be clearly seen that the third supporting surface 2" is approximately in the centre between the upper supporting surface 2 and the lower supporting surface 2'.

Figure 8A:
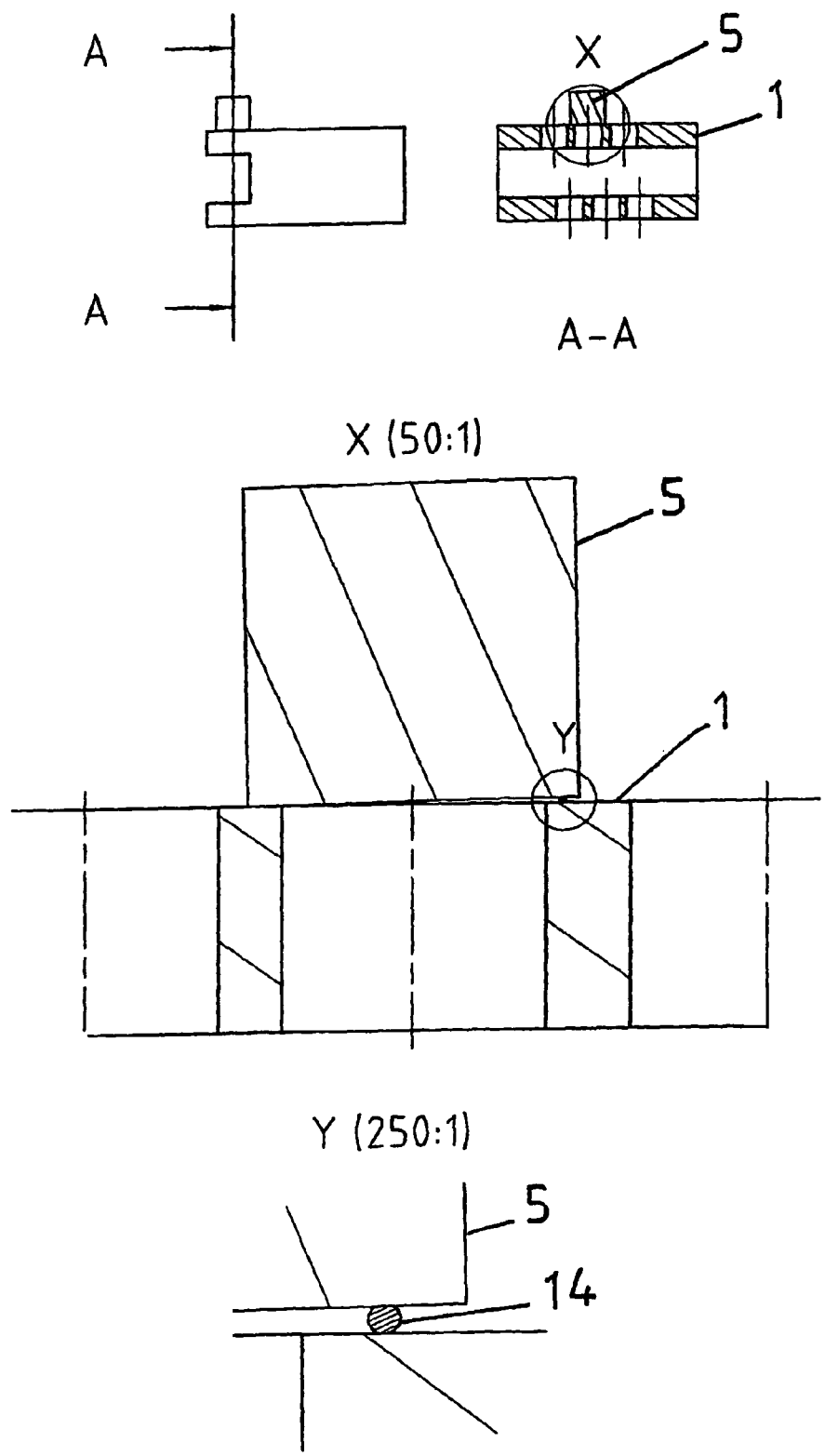
FIGS. 8a and 8b show a diagrammatic view of the adjustment procedure for a wave-modifying element on the supporting surface.

The views in FIG. 8a diagrammatically show a situation which can occur in passive adjustment, that is to say when mounting the wave-modifying elements to the support portion 1. Although, as will be described in greater detail hereinafter, the supporting surfaces 2, 2', 2" are produced as smoothly as possible, it can happen that a small unevenness or irregularity 14 occurs at the face of the supporting surface of the support portion 1 or on the contact surface of the wave-modifying element 5. As can be seen from the central view in FIG. 8a, that unevenness 14 means that the wave-modifying element 5 does not rest flat on the supporting surface of the support portion 1 but is tilted slightly with respect thereto. The wave-modifying element 5 is thus not optimally adjusted. It should be emphasised at this juncture that this effect is illustrated on an exaggerated scale in the illustrations. Normally the tilting cannot be observed with the naked eye.

Figure 8B:
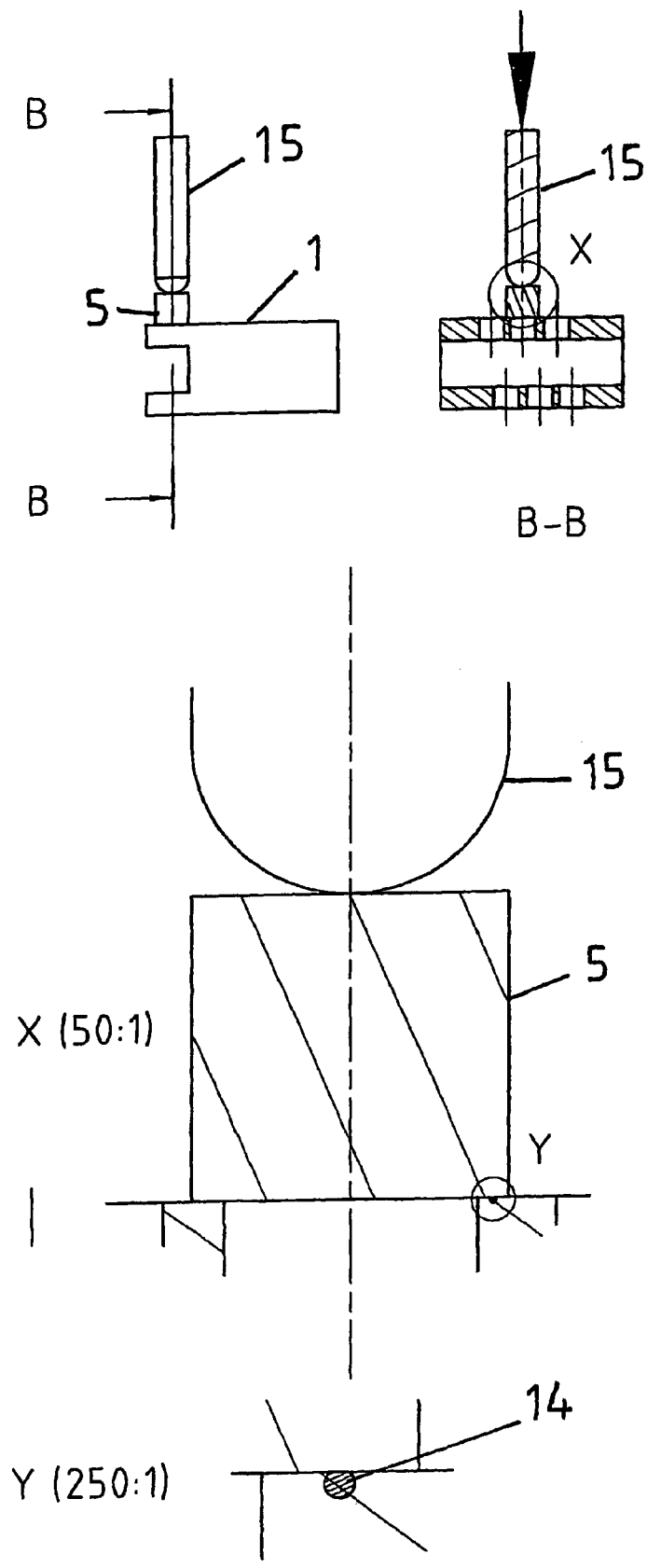

Therefore, in a preferred embodiment, it is provided that the support portion 1 or at least the supporting surface 2, 2', 2" comprises a ductile material. More specifically, in that case, as shown in the views in FIG. 8b, a kind of adjusting pin 15 can be used for passive adjustment of the wave-modifying element 5 on the support portion 1, the adjusting pin 15 applying a certain force to the top side of the wave-modifying element 5. As the support portion 1 is produced from a ductile material, this has the result, as can be clearly seen from the enlarged views identified by X and Y, that the local unevenness 14 is pressed into the ductile material by plastic or elastic deformation thereof. The result of this is that the wave-modifying element 5 is optimally adjusted.

As soon as the wave-modifying element 5 is correctly positioned, it can be fixed on the support portion 1 by means of an adhesive, by a procedure whereby the adhesive is applied surrounding the wave-modifying element 5 to the connecting location between the wave-modifying element 5 and the support portion 1. In that case, the pressure applied by the adjusting pin 15 is advantageously maintained during the glueing operation in order to prevent adhesive flowing between the wave-modifying element and the support portion 1 and possibly thereby lifting up the wave-modifying element 5 by a floating effect so that the precise adjustment is then lost or it comes to lie on the filter surface, which can detrimentally influence the passage of the beam.

Figure 9A:
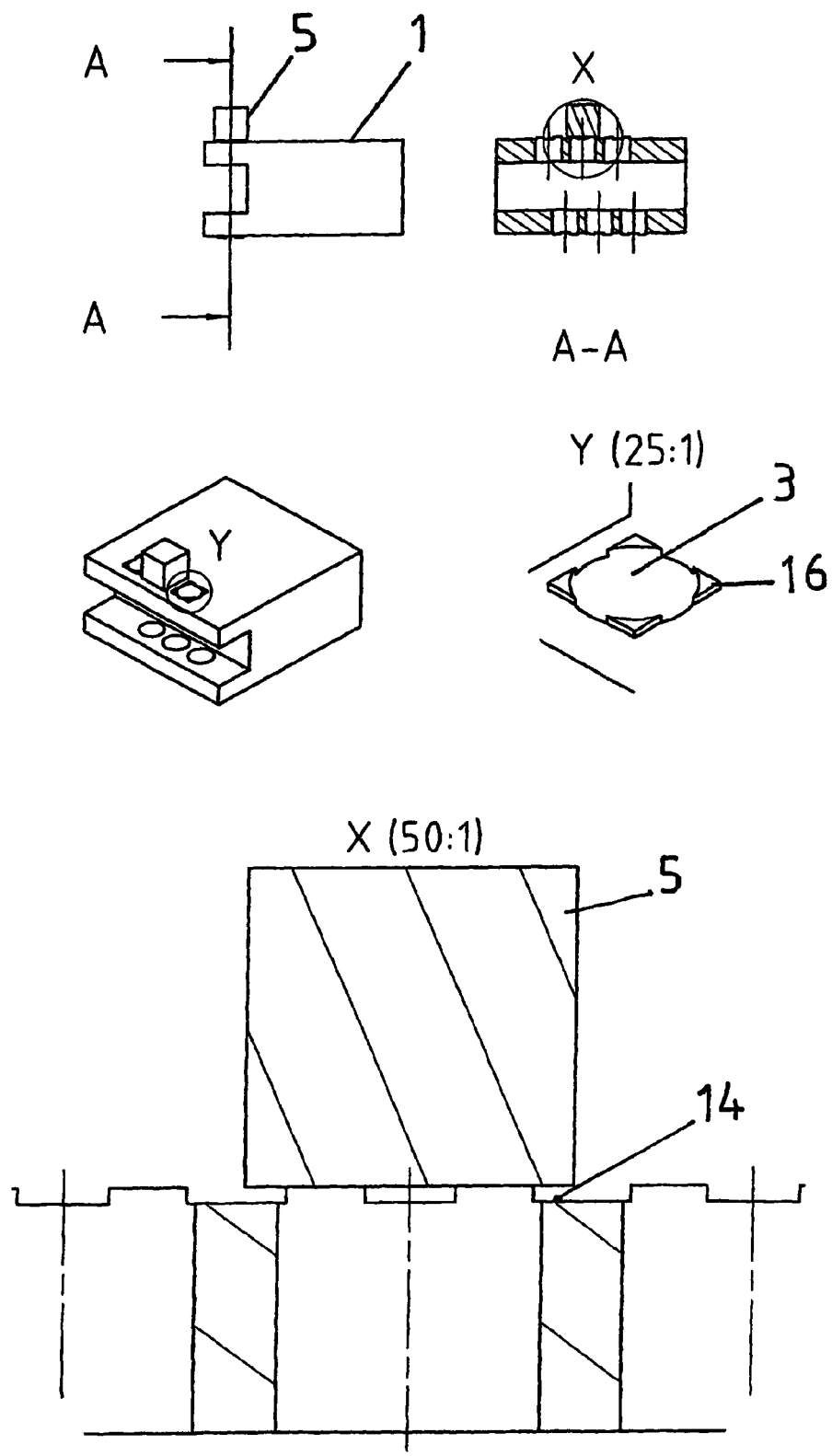
FIGS. 9a to 9c show a further diagrammatic view of the adjustment of a wave-modifying element on the supporting surface, the supporting surface being formed by supporting elements.
Figure 9B:
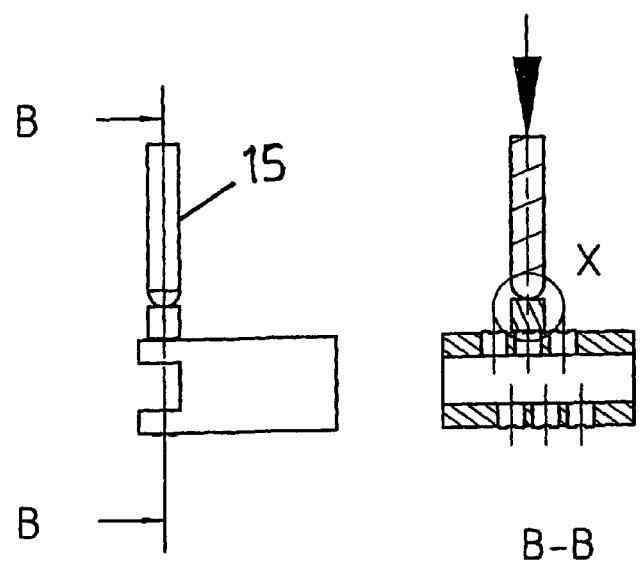
Figure 9B:
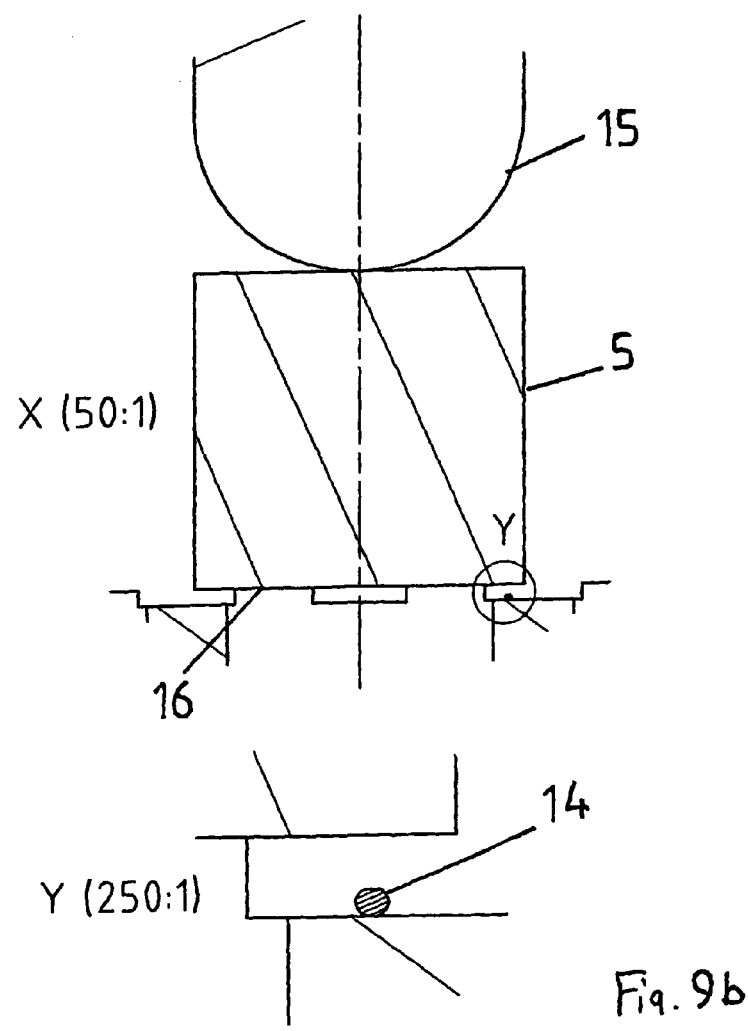

An alternative embodiment of the supporting surface is shown in the views in FIG. 9a. A row of supporting elements 16 is provided around the opening 3 formed by the through bore 3 in the supporting surface, as can be seen in particular in the enlarged view identified by Y. As a result, the supporting contact surface is reduced and the probability of an impurity either at the top side of the support portion 1 or at the underside of the wave-modifying element 5 resulting in the wave-modifying element being tilted with respect to the supporting surface of the support portion 1 is markedly reduced. In this embodiment therefore the supporting surface is only formed by the supporting elements 16.

In order to permit optimum passive adjustment it is possible for the contact surfaces of the wave-modifying elements to be checked prior to assembly and for only those wave-modifying elements which do not have any irregularities at all to be selected. In the embodiment with the supporting elements 16, checking of the surface of the wave-modifying elements can be restricted to those surface regions which are to come into contact with the supporting elements. That results in a reduction in the length of the checking operation and in addition the proportion of wave-modifying elements which cannot be used by virtue of irregularities is reduced.

In addition the supporting elements 16 are advantageously arranged in such a way that the wave-modifying element does not rest with one of its edges on the supporting element 16. The wave-modifying elements frequently have a sawn substrate so that burr formation or breakages can occur at the edges so that the wave-modifying element is frequently uneven precisely at the edges. With the illustrated arrangement of the supporting elements, a wave-modifying element with burr formation at the edge can be used without detriment.

Figure 9C:
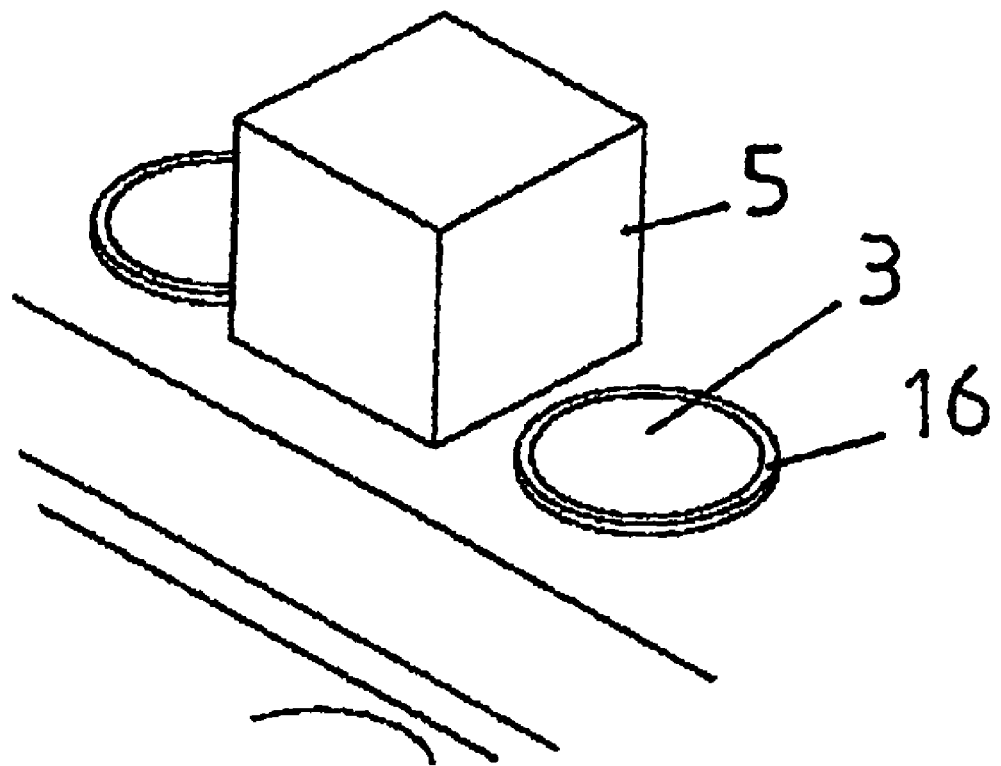
Figure 10:
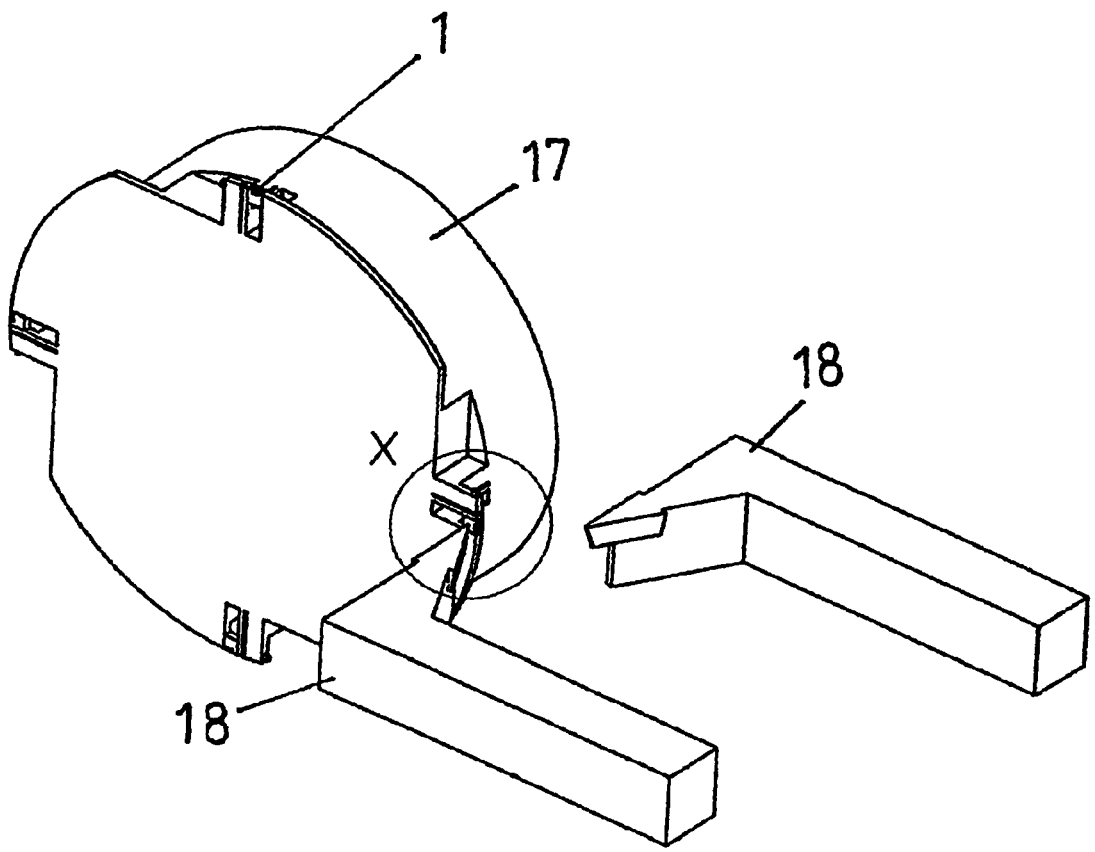
FIGS. 10a to 10d show a diagrammatic view of the production method according to the invention.
Figure 10:
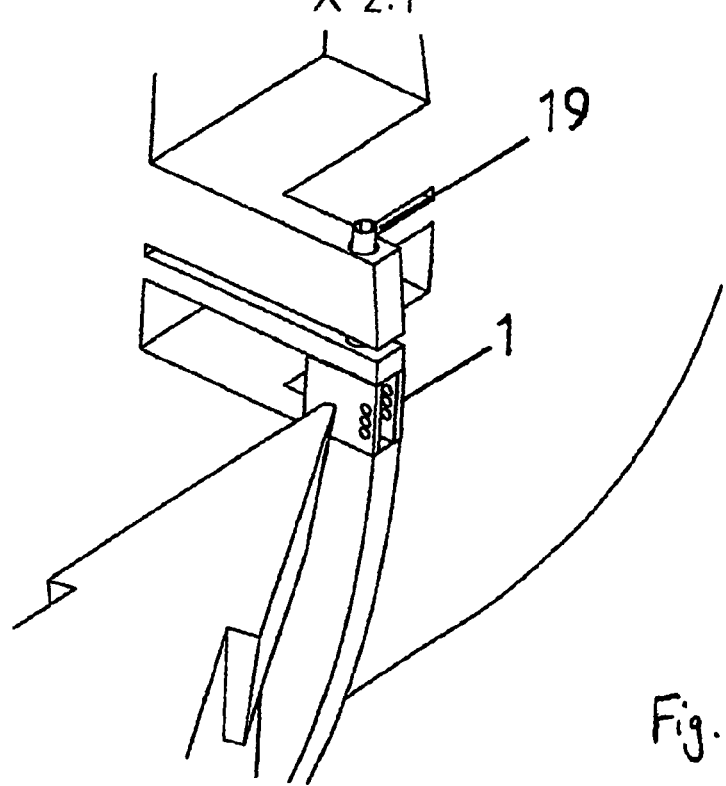
Figure 10C:
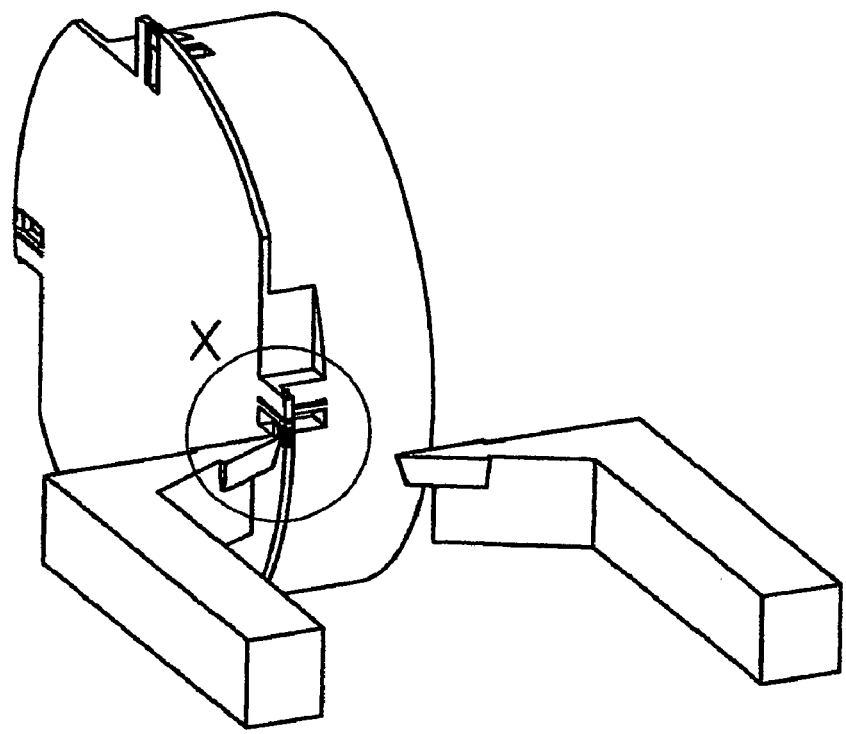
Figure 10D:
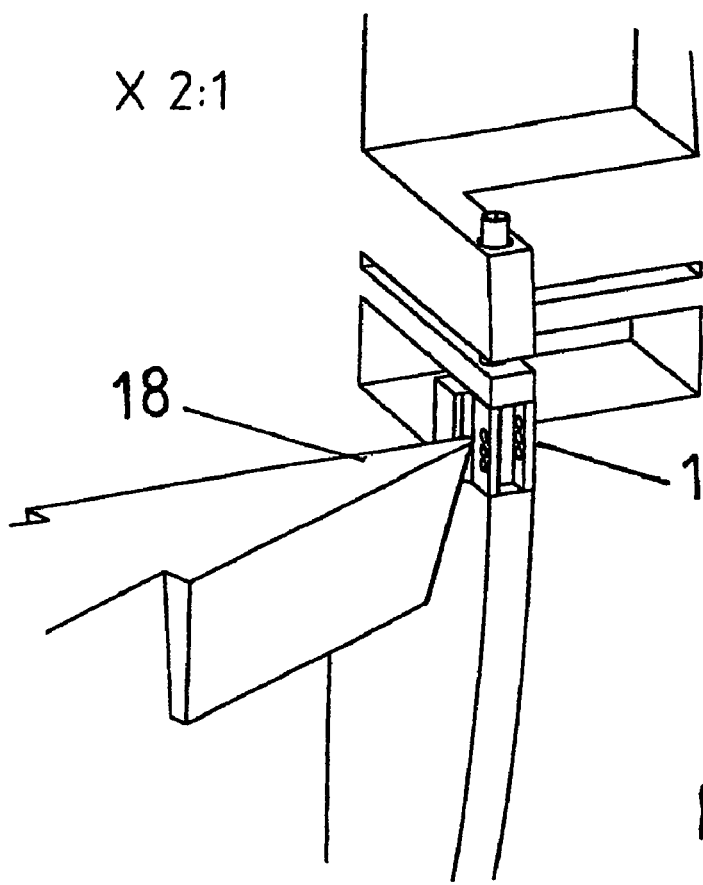

A particularly preferred embodiment is shown in FIG. 9c. Here the supporting surface is formed by a substantially annular supporting element 16 which extends around the opening in a ridge-like configuration. When the wave-modifying element 5 is fitted in place therefore the opening 3 is sealed off.

In that way fixing of the wave-modifying element 5 on the openings 3 is simplified as it is possible to use adhesive without the risk of the adhesive flowing into the openings 3 and floatingly lifting up the wave-modifying elements 5 or passing into the beam path.

FIGS. 10a to 10d show the production method according to the invention for a support portion 1. Firstly the through bores and possibly the channels extending parallel to the supporting surfaces, such as for example a milled pocket, are produced in the support portion 1. Then the support portion 1 is mounted at the periphery of a turning machine in such a way that the supporting surfaces 2, 2', 2" to be produced extend perpendicularly to the axis of rotation of the rotating part of the turning machine. When now the turning machine 17 is set in rotation, the two tool holders 18, in a single clamping arrangement, can be fed to the support portion 1 in such a way that the plane-parallel supporting surfaces 2, 2', 2" can be turned. The level of accuracy is markedly enhanced by virtue of the fact that all supporting surfaces are produced in a single clamping procedure.

In a further, particularly preferred embodiment of the method according to the invention at least one abutment surface of at least one spacer element is also produced in the same clamping procedure. That is possible in principle in relation to all the illustrated embodiments. Thus the pins as shown for example in FIG. 4b, prior to production of the abutment surface, could be inserted into the bores 10 and fixed, for example by means of adhesive or by a press fit. Then, in production of the parallel supporting surfaces, the abutment surfaces of the spacer elements can also be produced.

In the case of the embodiment shown by way of example in FIG. 5a, the abutment surfaces and the support surfaces can also be produced in one clamping procedure. If a flat spacer element is to be used, that can possibly be of a multi-part configuration in order to guarantee access of the turning tool to the supporting surfaces.

Figure 11:
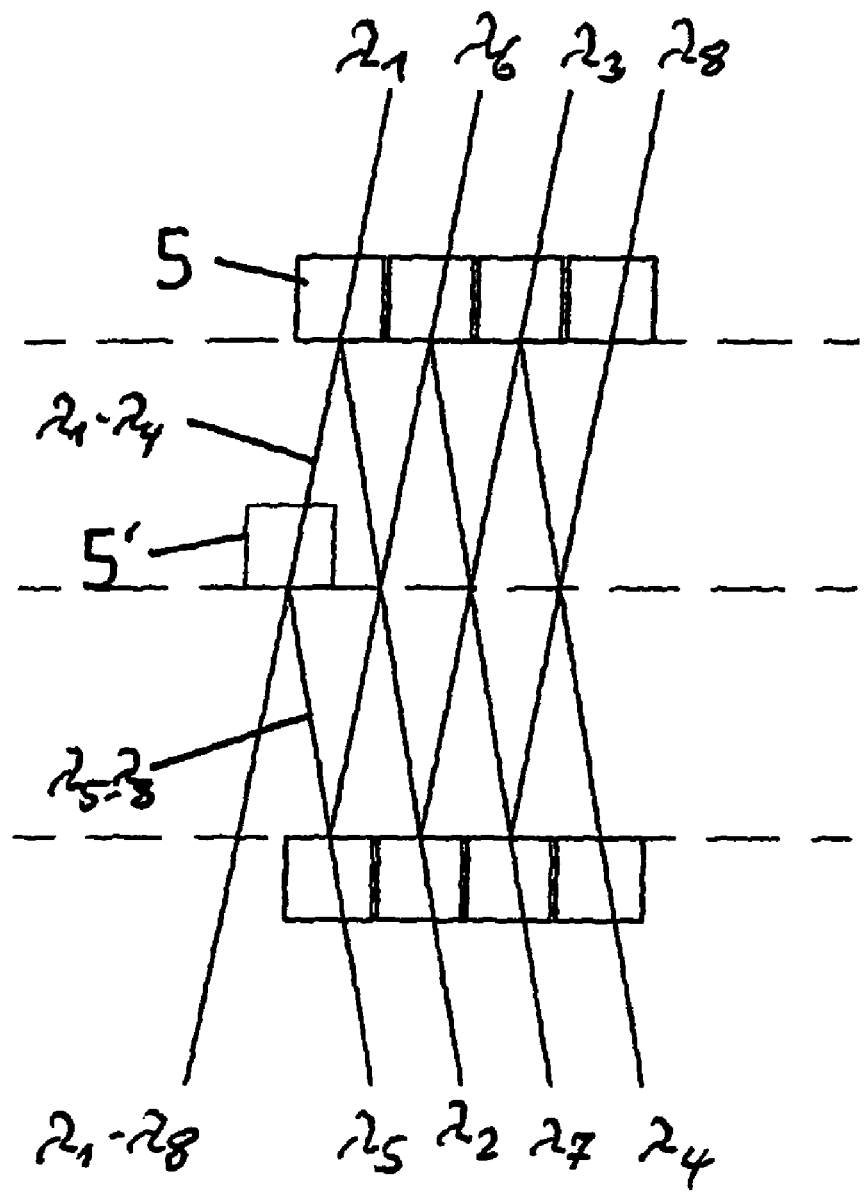
FIG. 11 shows a diagrammatic view of a first use of the invention.

FIG. 11 shows a first use by way of example of the support portion 1 according to the invention. This use substantially corresponds to the use already described with reference to FIGS. 6 and 7. The drawing shows an 8-channel multiplexer/demultiplexer system with a band filter.

Figure 12:
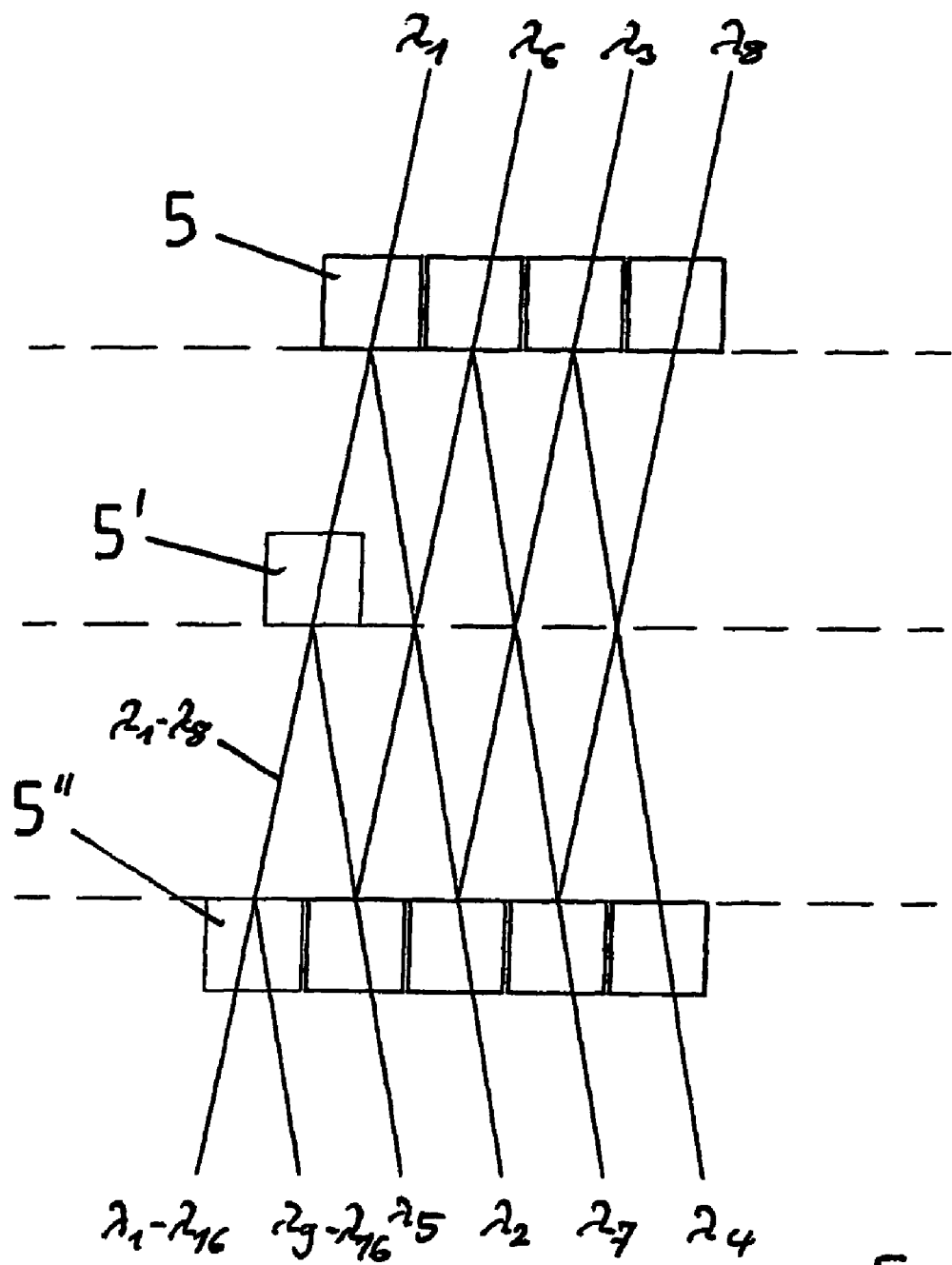
FIG. 12 shows a diagrammatic view of a second use of the invention.

FIG. 12 shows a second use. Here, there is additionally provided a wave-modifying element 5" which already provides for band separation so that this system can be easily expanded.

Figure 13:
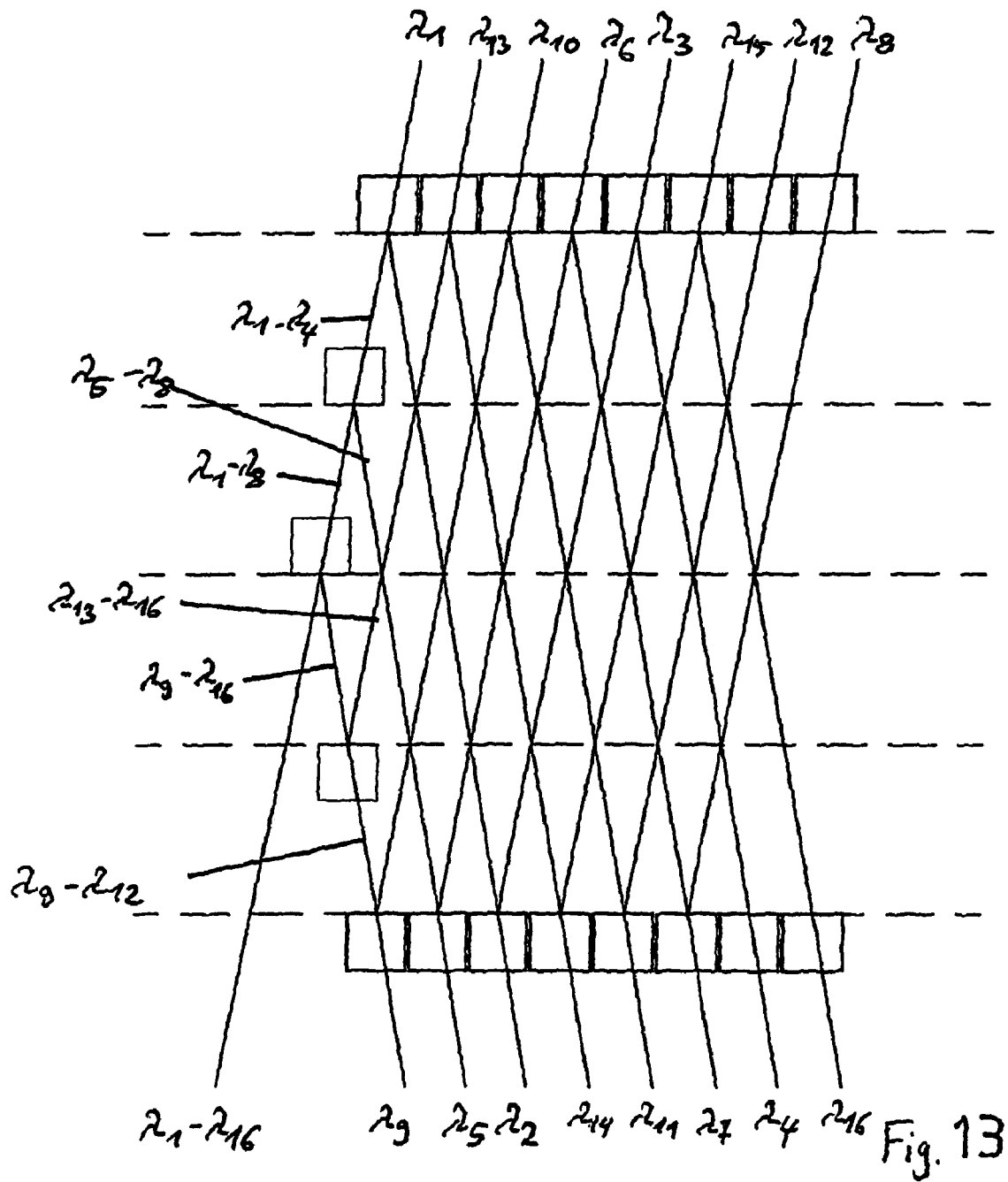
FIG. 13 shows a diagrammatic view of a third use of the invention.

FIG. 13 shows a 16-channel multiplexer/demultiplexer system with three band filters. This embodies a total of five parallel planes.

Figure 14:
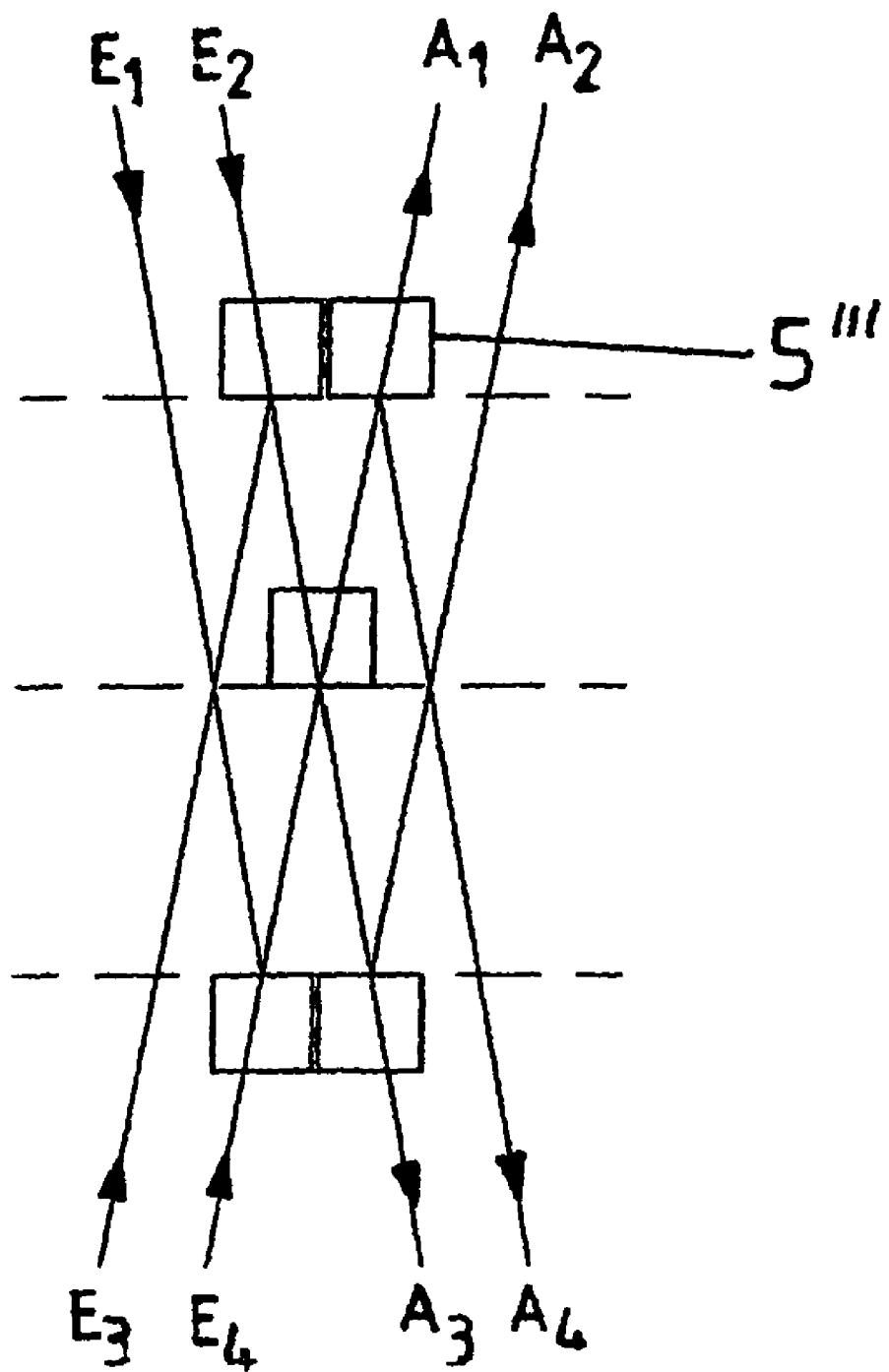
FIG. 14 shows a diagrammatic view of a fourth use of the invention.

FIG. 14 shows a 4×4-coupler with five 50% filters. The arrangement is made up of five wave-modifying elements 5''' which are here in the form of 50% filters. A 50% filter reflects about 50% of the incident light and transmits the remaining 50%. Four input signals are coupled into the arrangement by way of the four inputs $E_1, E_2, E_3$ and $E_4$. The light beam which is coupled in at $E_1$ firstly impinges on the 50% filter arranged at bottom left in the Figure. There 50% of the original intensity is reflected while 50% of the signal is transmitted and leaves the arrangement unused. The reflected beam impinges on the centrally arranged 50% filter at which once again only 50% of the signal is transmitted while the other 50% of the signal is reflected. The transmitted beam which is at about 25% of the original intensity now impinges on the 50% filter arranged at top right in the Figure where once again half the signal is transmitted, that is to say leaves the arrangement by way of the output $A_1$, and the other half is reflected, that is to say leaves the arrangement by way of the output $A_4$. In a similar manner the beam reflected at the central 50% filter impinges on the 50% filter arranged at bottom right where half the signal is transmitted, that is to say leaves the arrangement by way of the output $A_3$, and the other half is reflected, that is to say leaves the arrangement by way of the output $A_2$. In other words the signal which leaves the arrangement at $E_1$ is divided to the four outputs $A_1, A_2, A_3$ and $A_4$, but half of the intensity is already lost upon impinging on the first 50% filter. It can be clearly seen from the Figure that this also applies for signals input by way of the other inputs. The 4×4 therefore firstly adds the signals arriving by way of the four inputs and then branches the sum at the respective same level of intensity to the four outputs (4×4 star coupler).

Figure 15:
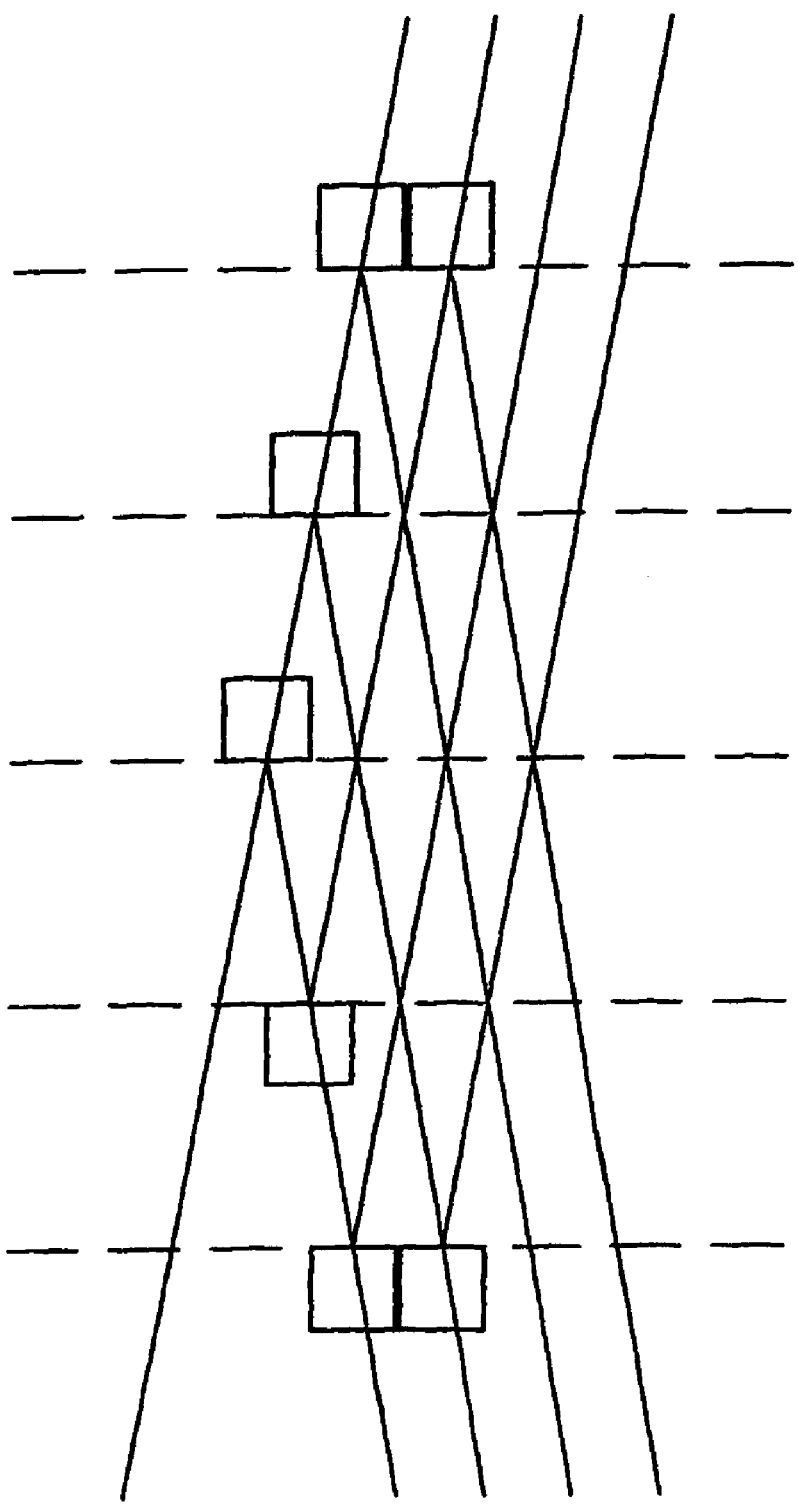
FIG. 15 shows a diagrammatic view of a fifth use of the invention.

Finally FIG. 15 shows a 1×8 branching device having 50% filters. Here a total of five planes are required. In this case a light beam coming from bottom left in the Figure is acted upon by the 50% filters which respectively reflect about 50% of the light (in almost wavelength-independent manner) and transmit the other 50%. In that way the light which is radiated into the arrangement is distributed to eight outputs which each have approximately an eighth of the level of light intensity which is radiated into the arrangement.

LIST OF REFERENCES 1 support portion
2, 2', 2" supporting surfaces
3 through bores
4 channel
5, 5', 5", 5''' wave-modifying elements
6 spacer element
7 coupling device
8 glass fibre
9 foot of the coupling device
10 bores
11 narrow portion
12 head
13 recess
14 unevenness
15 adjusting pin
16 supporting elements
17 turning machine
18 tool holder

The invention claimed is:

1. A support element portion for mounting at least two wave-modifying elements (5, 5', 5") with supporting surfaces (2, 2', 2") which are arranged in mutually parallel relationship, characterised in that one of the supporting surfaces (2, 2', 2") has at least two openings and the other supporting surface (2, 2', 2") has at least one opening, wherein the at least two openings of the one supporting surface and the at least one opening of the other supporting surface are connected together by way of at least one through bore (3).

2. A support portion (1) according to claim 1 characterised in that it is in one piece.

3. A support portion according to claim 1 or claim 2 characterised in that a plurality of wave-modifying elements (5, 5') are disposed on a supporting surface (2, 2', 2") in such a way that an opening (3) is completely covered by a respective one or more wave-modifying elements.

4. A support portion according to one of claims 1 to 2 characterised in that at least one supporting surface (2, 2', 2") has an opening for coupling a light signal in and/or out.

5. A support portion according to one of claims 1 to 2 characterised in that the opening of the other supporting surface (2') is on the central perpendicular on the connecting line between the two openings of the first supporting surface (2).

6. A support portion according to one of claims 1 to 2 characterised in that the openings are formed by circular bores, slots or recesses.

7. A support portion according to one of claims 1 to 2 characterised in that the openings are formed by bores (3) which extend substantially perpendicularly to the supporting surfaces (2, 2', 2") and which extend into a channel (4) extending substantially parallel to the supporting surfaces, wherein the channel (4) is in the form of a circular bore.

8. A support portion according to claim 3 characterised in that the wave-modifying element (5, 5') is fixed on the supporting surface (2, 2', 2") with a bonding agent adhesive.

9. A support portion according to one of claims 1 to 2 characterised in that it is made from ductile material.

10. A support portion according to one of claims 1 to 2 characterised in that it is made from one of the group POM or PEEK.

11. A support portion according to one of claims 1 to 2 characterised in that at least one supporting surface (2) has a spacer element (6) on the side remote from another supporting surface (2').

12. A support portion according to claim 11 characterised in that the spacer element (6) has two abutment surfaces which extend in mutually parallel relationship.

13. A support portion according to claim 11 or claim 12 characterised in that the spacer element(6) has a through passage on the side towards the supporting surface (2, element 2'), in which the wave-modifying element (5, 5') is arranged.

14. A support portion according to claim 11 characterised in that the spacer element (6) comprises a precision film.

15. A support portion according to claim 11 characterised in that the spacer element (6) comprises one pin which extends through both supporting surfaces (2, 2').

16. A support portion according to claim 15 characterised in that the spacer element (6) is formed by at least two pins, wherein the pins are of a different length and comprise different material, wherein the difference in length and the choice of material is selected that a relative movement of a coupling device fixed to the support portion with respect to the support portion as a consequence of a fluctuation in temperature is at least partially compensated.

17. A support portion according to claim 11 characterised in that the spacer element (6) and the support portion (2) are integral.

18. A support portion according to one of claims 1 to 2 characterised in that there are provided at least three mutually parallel supporting surfaces (2, 2', 2").

19. A support portion according to one of claims 1 to 2 characterised in that at least one wave-modifying element is a narrow-band mirror.

20. A multiplexer/demultiplexer having a support portion according to one of claims 1 to 2.

21. A beam splitter, branching device and/or coupler having a support portion according to one of claims 1 to 2.

22. A method of producing a support portion for mounting at least two wave-modifying elements, which comprises the following steps:
    selecting a material block having a first and a second surface,
    providing one or more through passages which open into at least one opening in the first surface of the material block and into at least two openings in the second surface of the material block, so that the through passages connect each of the openings and the first and second surfaces together, and
    producing at least two supporting surfaces which extend in mutually parallel relationship,
    wherein the one supporting surface is arranged on the first surface of the material block and the other supporting surface is arranged on the second surface of the material block.

23. A method according to claim 22 characterised in that the supporting surfaces are produced after the through passages have been provided.

24. A method according to claim 22 or claim 23 characterised in that the supporting surfaces are produced with an averaged roughness depth Rz (in accordance with DIN 4768) of a range of 20-100 nm.

25. A method according to one of claims 22 to 23 characterised in that the supporting surface is produced by ultra-precision machining.

26. A method according to claim 25 characterised in that the supporting surface is produced by a turning method, wherein the material block is clamped on the periphery of a rotating device in such a way that the supporting surfaces to be produced are oriented perpendicularly to the axis of rotation of the rotating device.

27. A method according to claim 26 characterised in that all supporting surfaces are produced in one clamping procedure.

28. A method according to one of claims 22 to 23 characterised in that a channel which extends approximately parallel to the supporting surfaces is provided, wherein the channel is in the form of a circular bore.

29. A method according to one of claims 22 to 23 characterised in that at least one spacer element with at least one abutment surface is fitted.

30. A method according to claim 29 characterised in that the abutment surface of the spacer element is produced in one clamping procedure together with the supporting surfaces.

31. A method of producing an optical modifier, which comprises the following steps:
    producing a support portion with a method according to one of claims 22 to 23,
    placing at least one wave-modifying element on a supporting surface, and
    fixing the wave-modifying element on the supporting surface.

32. A method according to claim 31 characterised in that fixing is effected with a bonding agent adhesive.

33. A support portion according to one of claims 1 to 2 characterized in that the supporting surfaces (2, 2', 2") is formed by one or more supporting elements (16) arranged next to the opening.

34. A support portion according to one of claims 1 to 2 characterized in that the supporting surfaces (2, 2', 2") have an averaged roughness depth Rz of 20-100 nm.

35. A support portion according to one of claims 1 to 2 characterized in that the supporting surfaces (2, 2', 2") have an averaged roughness depth Rz of less than 20 nm.

36. A support portion according to one of claims 1 to 2 characterized in that the supporting surfaces (2, 2', 2") have a surface that has been produced by ultra-precision machining.

37. A support portion according to one of claims 1 to 2 characterized in that the supporting surfaces (2, 2', 2") have a surface that has been produced by diamond turning or diamond milling.

38. A method according to claim 22 or claim 23 characterised in that the supporting surfaces are produced with an averaged roughness depth Rz (in accordance with DIN 4768) of less than 20 nm.

39. A method according to one of claims 22 to 23 characterised in that the supporting surface is produced by diamond turning or diamond milling.

* * * * *